US009128875B2

(12) United States Patent
Lee et al.

(10) Patent No.: US 9,128,875 B2
(45) Date of Patent: Sep. 8, 2015

(54) SIGNAL TRANSFORMATION APPARATUS APPLIED HYBRID ARCHITECTURE, SIGNAL TRANSFORMATION METHOD, AND RECORDING MEDIUM

(75) Inventors: Moon Ho Lee, Jeonju-si (KR); Danping Xu, Jeonju-si (KR)

(73) Assignee: Industrial Cooperation Foundation Chonbuk National University, Jeonju-si (KR)

( * ) Notice: Subject to any disclaimer, the term of this patent is extended or adjusted under 35 U.S.C. 154(b) by 512 days.

(21) Appl. No.: 13/537,346

(22) Filed: Jun. 29, 2012

(65) Prior Publication Data

US 2013/0101048 A1 Apr. 25, 2013

(30) Foreign Application Priority Data

Oct. 19, 2011 (KR) ........................ 10-2011-0107029

(51) Int. Cl.

| | |
|---|---|
| ***G06F 17/14*** | (2006.01) |
| ***H04N 19/134*** | (2014.01) |
| ***H04N 19/12*** | (2014.01) |
| ***H04N 19/635*** | (2014.01) |

(52) U.S. Cl.

CPC ................ *G06F 17/14* (2013.01); *H04N 19/12* (2014.11); *H04N 19/134* (2014.11); *H04N 19/635* (2014.11)

(58) Field of Classification Search

CPC ............. G06F 17/14; H04N 19/00824; H04N 19/00133; H04N 19/00078; H04N 7/26563; H04N 7/2659; H04N 7/26398; H04N 7/26585; H04N 7/26154; H04N 19/00775; H04N 19/00812; H04N 7/30; H04N 7/2626

USPC .................................................... 375/240.19

See application file for complete search history.

(56) References Cited

U.S. PATENT DOCUMENTS

| | | | | |
|---|---|---|---|---|
| 4,964,166 | A * | 10/1990 | Wilson | 704/229 |
| 5,497,435 | A * | 3/1996 | Berger | 382/249 |
| 5,603,012 | A * | 2/1997 | Sotheran | 712/208 |
| 5,757,432 | A * | 5/1998 | Dulong et al. | 348/384.1 |
| 5,784,631 | A * | 7/1998 | Wise | 382/246 |
| 5,790,686 | A * | 8/1998 | Koc et al. | 382/107 |
| 5,809,270 | A * | 9/1998 | Robbins | 712/200 |
| 5,842,033 | A * | 11/1998 | Wise et al. | 712/1 |
| 5,881,301 | A * | 3/1999 | Robbins | 712/1 |
| 5,956,519 | A * | 9/1999 | Wise et al. | 712/16 |
| 5,978,592 | A * | 11/1999 | Wise | 712/1 |
| 6,035,126 | A * | 3/2000 | Wise et al. | 712/29 |
| 6,047,112 | A * | 4/2000 | Wise et al. | 714/1 |
| 6,112,017 | A * | 8/2000 | Wise | 712/200 |
| 6,529,631 | B1 * | 3/2003 | Peterson et al. | 382/232 |
| 6,611,560 | B1 * | 8/2003 | Kresch et al. | 375/240.16 |
| 7,216,140 | B1 * | 5/2007 | Chen et al. | 708/607 |

(Continued)

OTHER PUBLICATIONS

Hou et al, Simple Element Inverse DCT/DFT Hybrid Architecture Algorithm, 2006.*

(Continued)

*Primary Examiner* — Shan Elahi

(74) *Attorney, Agent, or Firm* — Sughrue Mion, PLLC

(57) ABSTRACT

A signal transformation apparatus, a signal transformation method, and a recording medium are provided. The signal transformation apparatus selects any one of DCT-II, DST-II, DFT, and HWT, and transforms and outputs the input signal according to the selected transform. Therefore, the hybrid architecture of low complexity can be attained.

6 Claims, 17 Drawing Sheets

(56) References Cited

U.S. PATENT DOCUMENTS

| | | | | |
|---|---|---|---|---|
| 7,218,789 | B2 * | 5/2007 | Faber et al. | 382/244 |
| 7,720,140 | B2 * | 5/2010 | Guevorkian et al. | 375/232 |
| 8,090,025 | B2 * | 1/2012 | Sakazume | 375/240.16 |
| 8,417,045 | B2 * | 4/2013 | Hinds | 382/250 |
| 8,451,904 | B2 * | 5/2013 | Reznik et al. | 375/240.2 |
| 8,582,869 | B2 * | 11/2013 | Atoyan | 382/154 |
| 8,631,060 | B2 * | 1/2014 | Reznik et al. | 708/400 |
| 8,682,681 | B2 * | 3/2014 | Fuchs et al. | 704/500 |
| 8,718,144 | B2 * | 5/2014 | Reznik et al. | 375/240.2 |
| 2003/0133500 | A1 * | 7/2003 | Auwera et al. | 375/240.11 |
| 2003/0182544 | A1 * | 9/2003 | Wise et al. | 712/300 |
| 2004/0039903 | A1 * | 2/2004 | Wise et al. | 712/300 |
| 2006/0078052 | A1 * | 4/2006 | Dang | 375/240.24 |
| 2009/0157785 | A1 * | 6/2009 | Reznik et al. | 708/402 |

OTHER PUBLICATIONS

Park et al, DCT/Haar/Slant Sparse Matrix Generation via Jacket Matrix, 2006.*

Shao et al, Type-II /III DCT/DST algorithms with reduced number of arithmetic operations, 2009.*

Korea Office Action dated Apr. 1, 2013.

Xu et al. "Fast Hybrid Transform: DCT-II/DFT/HWT" Journal of Broadcast Engineering, May 16, 2011. pp. 782-792.

* cited by examiner

SIGNAL TRANSFORMATION APPARATUS APPLIED HYBRID ARCHITECTURE, SIGNAL TRANSFORMATION METHOD, AND RECORDING MEDIUM

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Oct. 19, 2011, and assigned Serial No. 10-2011-0107029, the entire disclosure of which is hereby incorporated by reference.

TECHNICAL FIELD OF THE INVENTION

The present invention relates generally to a signal transformation apparatus, a signal transformation method, and a recording medium. More particularly, the present invention relates to a signal transformation apparatus with a hybrid architecture applied, a signal transformation method, and a recording medium.

BACKGROUND OF THE INVENTION

Digital video technology goes through a hybrid fusion revolution over the last decade. Digital videos are applied to many fields such as DVD player, computer, and mobile handset. Nowadays, High Efficiency Video Coding (HEVC) is under development in combination with ISO/IEC Moving Picture Experts Group (MPEG) and ITU-T Video Coding Experts Group (VCEG). The MPEG and the VCEG create Joint Collaborative Team on Video Coding (JCT-VC) for HEVC standardization.

Recently, it is possible to easily catch news on the web using a smart TV or an iPhone. Video compression is essential to all of these applications. Discrete Cosine Transform (DCT)-II is a popular compression structure and accepted as the best suboptimal transformation exhibiting the performance quite close to the optimal Karhunen-Loeve transform for MPEG 4 and H.264 standard. Discrete orthogonal transform is used for applications of signal classification and representation. Discrete signal processing of Discrete Fourier Transform (DFT) is a popular transformation for Orthogonal Frequency Division Multiplexing $4^{th}$ Generation (OFDM-4G) and communication. The OFDM is a key technology for next-generation mobile communication (3GPP-LTE, mobile WiMAX, IMT-Advanced) as well as wireless LAN (IEEE 802.11a, IEEE 802.11n), wireless PAN (multiband OFDM), and DFT-based broadcasting (DAB, DVB, DMB). Further, discrete wavelet transform based on Haar Wavelet Transform (HWT) is very useful in JPEG 2000 standard and signal analysis. What is needed is a method for applying the four transforms more easily.

SUMMARY OF THE INVENTION

To address the above-discussed deficiencies of the prior art, it is a primary aspect of the present invention to provide a signal transformation apparatus for selecting one of DCT-II, DST-II, DFT, and HWT, transforming and outputting an input signal according to the selected transform, a signal transformation method, and a recording medium.

According to one aspect of the present invention, a signal transformation apparatus applying a hybrid architecture for Discrete Cosine Transform (DCT)-II, Discrete Sine Transform (DST)-II, Discrete Fourier Transform (DFT), and Haar Wavelet Transform (HWT) includes a switching part for selecting any one of the DCT-II, the DST-II, the DFT, and the HWT; and a transformation part for transforming and outputting an input signal according to the transform selected by the switching part.

The switching part may include a submatrix selector for selecting submatrix computation for any one of the DCT-II, the DST-II, the DFT, and the HWT; and a permutation matrix selector for selecting permutation matrix computation for any one of the DCT-II, the DST-II, the DFT, and the HWT.

When the switching part selects the DCT-II, the submatrix selector may select $[L]_N$ as a submatrix and the permutation matrix selector selects $[D]_N$ as a permutation matrix.

The transformation part may apply the DCT-II to the input signal by computing Equation (27) using the submatrix $[L]_N$ and the permutation matrix $[D]_N$:

$$[C]_N = \sqrt{\frac{2}{N}}\,[Pr]_N\begin{bmatrix} I_{N/2} & 0 \\ 0 & L_{N/2} \end{bmatrix}[I_2 \otimes Pr_{N/2}]\left[I_2 \otimes \begin{bmatrix} I_{N/4} & 0 \\ 0 & L_{N/4} \end{bmatrix}\right]\begin{bmatrix} I_4 \otimes \\ Pr_{N/4} \end{bmatrix} \tag{27}$$

$$\left[I_4 \otimes \begin{bmatrix} I_{N/8} & 0 \\ 0 & L_{N/8} \end{bmatrix}\right] \ldots \; [I_{N/4} \otimes Pr_4]\left[I_{N/4} \otimes \begin{bmatrix} I_2 & 0 \\ 0 & L_2 \end{bmatrix}\right][I_{N/2} \otimes C_2]\left[I_{N/4} \otimes \begin{bmatrix} I_2 & 0 \\ 0 & D_2 \end{bmatrix}\right]\left[I_{N/4} \otimes \begin{bmatrix} I_2 & I_2 \\ I_2 & -I_2 \end{bmatrix}\right][I_{N/4} \otimes Pc_4]$$

$$\ldots \left[I_4 \otimes \begin{bmatrix} I_{N/8} & 0 \\ 0 & D_{N/8} \end{bmatrix}\right]$$

$$\left[I_4 \otimes \begin{bmatrix} I_{N/8} & I_{N/8} \\ I_{N/8} & -I_{N/8} \end{bmatrix}\right][I_4 \otimes Pc_{N/4}]\left[I_2 \otimes \begin{bmatrix} I_{N/4} & 0 \\ 0 & D_{N/4} \end{bmatrix}\right]\left[I_4 \otimes \begin{bmatrix} I_{N/4} & I_{N/4} \\ I_{N/4} & -I_{N/4} \end{bmatrix}\right][I_2 \otimes Pc_{N/2}]\begin{bmatrix} I_{N/2} & 0 \\ 0 & D_{N/2} \end{bmatrix}\begin{bmatrix} I_{N/2} & I_{N/2} \\ I_{N/2} & -I_{N/2} \end{bmatrix}[Pc]^N$$

When the switching part selects the DST-II, the submatrix selector may select $[U]_N$ as a submatrix and the permutation matrix selector selects $[D]_N$ as a permutation matrix.

The transformation part may apply the DST-II to the input signal by computing Equation (45) by using the submatrix $[U]_N$ and the permutation matrix $[D]_N$ and multiplying every output by a matrix $[M_1]$ $[M_2]$:

$$
\begin{aligned}
[S]_N &= \sqrt{\frac{2}{N}}\,[S]_N \\
&= \sqrt{\frac{2}{N}}\,[Pr]_N \begin{bmatrix} U_{N/2} & 0 \\ 0 & I_{N/2} \end{bmatrix} \left[ I_2 \otimes \underbrace{\left[ \cdots \left[ I_2 \otimes \underbrace{\left[ [Pr]_4 \begin{bmatrix} U_2 & 0 \\ 0 & I_2 \end{bmatrix} [I_2 \otimes S_2] \begin{bmatrix} D_2 & 0 \\ 0 & I_2 \end{bmatrix} \begin{bmatrix} I_2 & I_2 \\ I_2 & -I_2 \end{bmatrix} [Pc]_4 \right]}_{S_4} \right] \cdots \right]}_{S_{N/2}} \right] \\
&\quad \begin{bmatrix} D_{N/2} & 0 \\ 0 & I_{N/2} \end{bmatrix} \begin{bmatrix} I_{N/2} & I_{N/2} \\ I_{N/2} & -I_{N/2} \end{bmatrix} [Pc]_N.
\end{aligned} \tag{45}
$$

When the switching part selects the DFT, the submatrix selector may select $[Pr]_N$ as a submatrix and the permutation matrix selector selects $[W]_n$ as a permutation matrix.

The transformation part may apply the DFT to the input signal by computing Equation (56) by using the submatrix $[Pr]_N$ and the permutation matrix $[W]_n$, multiplying the input signal by a matrix $[M_3]$ during first h steps of 2h steps, and multiplying a matrix $[M_4]$ during last h steps:

$$
\begin{aligned}
[F]_N &= ([Pr]_N)^{-1}[\tilde{F}]_N \\
&= ([Pr]_N)^{-1} \begin{bmatrix} I_{N/2} & 0 \\ 0 & Pr_{N/2} \end{bmatrix} \begin{bmatrix} \tilde{F}_{N/2} & 0 \\ 0 & \tilde{F}_{N/2} \end{bmatrix} \begin{bmatrix} I_{N/2} & 0 \\ 0 & W_{N/2} \end{bmatrix} \begin{bmatrix} I_{N/2} & I_{N/2} \\ I_{N/2} & -I_{N/2} \end{bmatrix} \\
&= [Pr]_N \begin{bmatrix} I_{N/2} & 0 \\ 0 & Pr_{N/2} \end{bmatrix} [I_2 \otimes Pr_{N/2}] \left[ I_2 \otimes \begin{bmatrix} I_{N/4} & 0 \\ 0 & Pr_{N/4} \end{bmatrix} \right] \cdots [I_{N/4} \otimes Pr_4] \\
&\quad \left[ I_{N/4} \otimes \begin{bmatrix} I_2 & 0 \\ 0 & Pr_2 \end{bmatrix} \right] [I_{N/2} \otimes F_2] \left[ I_{N/4} \otimes \begin{bmatrix} I_2 & 0 \\ 0 & W_2 \end{bmatrix} \right] \\
&\quad \left[ I_{N/4} \otimes \begin{bmatrix} I_2 & I_2 \\ I_2 & -I_2 \end{bmatrix} \right] \cdots \left[ I_2 \otimes \begin{bmatrix} I_{N/4} & 0 \\ 0 & W_{N/4} \end{bmatrix} \right] \\
&\quad \left[ I_2 \otimes \begin{bmatrix} I_{N/4} & I_{N/4} \\ I_{N/4} & -I_{N/4} \end{bmatrix} \right] \begin{bmatrix} I_{N/2} & 0 \\ 0 & W_{N/2} \end{bmatrix} \begin{bmatrix} I_{N/2} & I_{N/2} \\ I_{N/2} & -I_{N/2} \end{bmatrix} \\
&= [Pr]_N^{-1} \begin{bmatrix} I_{N/2} & 0 \\ 0 & Pr_{N/2} \end{bmatrix} \left[ I_2 \otimes \underbrace{\left[ \cdots \underbrace{[Pr]_4^{-1} \begin{bmatrix} I_2 & 0 \\ 0 & Pr_2 \end{bmatrix} [I_2 \otimes \tilde{F}_2] \begin{bmatrix} I_2 & 0 \\ 0 & W_2 \end{bmatrix} \begin{bmatrix} I_2 & I_2 \\ I_2 & -I_2 \end{bmatrix}}_{\tilde{F}_4} \cdots \right]}_{\tilde{F}_{N/2}} \right] \\
&\quad \begin{bmatrix} I_{N/2} & 0 \\ 0 & W_{N/2} \end{bmatrix} \begin{bmatrix} I_{N/2} & I_{N/2} \\ I_{N/2} & -I_{N/2} \end{bmatrix}.
\end{aligned} \tag{56}
$$

-continued $$
\begin{bmatrix} I_{N/2} & & 0 \\ & rI_{N/4} & \\ 0 & & Pb_{N/4} \end{bmatrix} \begin{bmatrix} I_{N/2} & & 0 \\ & I_{N/4} & I_{N/4} \\ 0 & I_{N/4} & -I_{N/4} \end{bmatrix} \begin{bmatrix} rI_{N/2} & 0 \\ 0 & Pb_{N/2} \end{bmatrix}
$$

When the switching part selects the HWT, the submatrix selector may select $[Pa]_N$ as a submatrix and the permutation matrix selector selects $[Pb]_N$ as a permutation matrix.

The transformation part may apply the HWT to the input signal by computing Equation (64) by using the submatrix $[Pa]_N$ and the permutation matrix $[Pb]_N$ and multiplying the input signal by a matrix $[M_5]$ during last h steps of 2h steps:

$$
\begin{aligned}
[H]_N &= [Pi]_N^{-1}[\overset{\square}{H}]_N[Pj]_N^{-1} \\
&= \frac{1}{r}[Pa]_N \begin{bmatrix} I_{N/2} & 0 \\ 0 & Pa_{N/2} \end{bmatrix} \begin{bmatrix} I_{3N/4} & 0 \\ 0 & Pa_{N/4} \end{bmatrix} \cdots \\
&\quad \begin{bmatrix} I_{N-2} & 0 \\ 0 & Pa_2 \end{bmatrix} \begin{bmatrix} I_{N-2} & 0 \\ 0 & \overset{\square}{H}_2 \end{bmatrix} \begin{bmatrix} I_{N-4} & & 0 \\ & rI_2 & \\ 0 & & Pb_2 \end{bmatrix} \begin{bmatrix} I_{N-4} & & 0 \\ & I_2 & I_2 \\ 0 & I_2 & -I_2 \end{bmatrix} \cdots
\end{aligned} \tag{64}
$$

-continued $$
\begin{bmatrix} I_{N/2} & I_{N/2} \\ I_{N/2} & -I_{N/2} \end{bmatrix} [Pb]_N.
$$

A signal transformation method may be applied to the signal transformation apparatus.

A computer-readable recording medium may contain a computer program for executing functions of the signal transformation apparatus.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE INVENTION

Figure 1A:
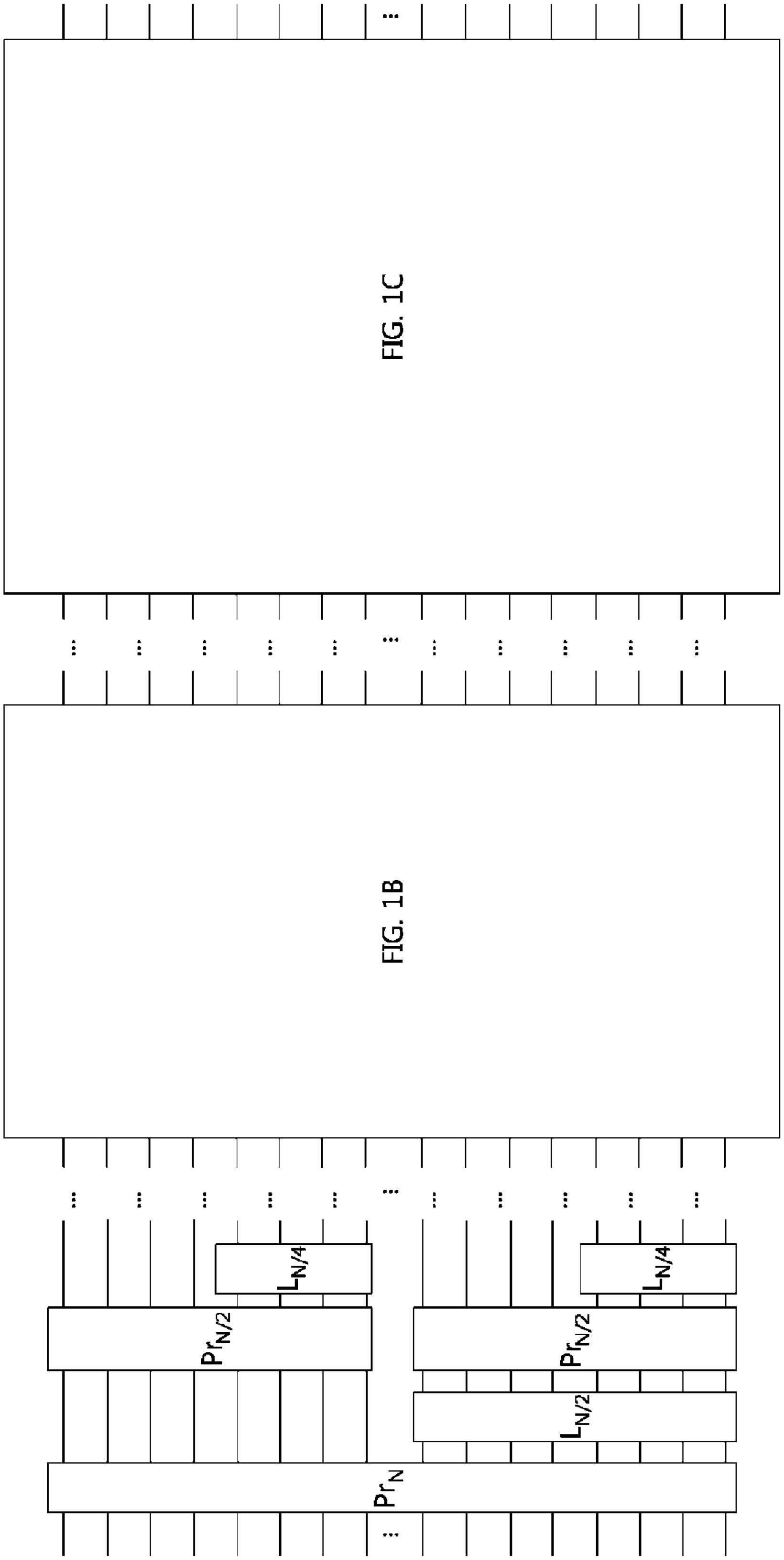
FIG. 1A-1C is a butterfly data flow graph of Equation (27) according to an exemplary embodiment of the present invention.

The following description with reference to the accompanying drawings is provided to assist in a comprehensive understanding of exemplary embodiments of the invention as defined by the claims and their equivalents.

I. Introduction

Exemplary embodiments of the present invention provide a fast DCT-II/DST-II/DFT/HWT hybrid transform architecture for new digital videos and fusion mobile handsets based on Jacket-like sparse matrix decomposition. The fast hybrid architecture includes source coding standard such as MPEG4 and JPEG 2000, and digital filtering discrete Fourier transform. The fast hybrid architecture includes two operations. One operation is Block-wise Inverse Jacket Matrix (BIJM) for DCT-II/DST-II and the other operation is Element-wise Inverse Jacket Matrix (EIJM) for DFT/HWT. These operations have similar recursive computational fashion, which implies that they can be decomposed to Kronecker products of an identity Hadamard matrix and a successively lower-order sparse matrix. Based on this, it is possible to develop a single chip applying the signal transformation apparatus of the fast hybrid algorithm architecture for intelligent mobile handsets.

For doing so, the present invention provides sparse unified matrix factorization for the unified chip based on the Jacket matrix.

Analysis and decomposition of the sparse matrix is a useful tool for fast computations and character generation. DCT-II, DST-II, DFT and HWT matrices can be decomposed to one orthogonal character matrix and a special sparse matrix. The inverse of the sparse matrix is a block-wise inverse or an element-wise inverse. Mathematically, when $[A]_N=[a_{ij}]_N$ is a matrix and $$[J]_N^{-1}=\frac{1}{N}[a_{ij}^{-1}]_N^T$$

is its inverse, the matrix A corresponds to the Jacket matrix. The special sparse matrix belongs to the Jacket matrix.

Hereafter, the hybrid architecture for combining the unified architecture of the sparse matrix decomposition and the DCT-II, the DST-II, the DFT, and the HWT is explained.

II. Block-Wise Inverse Sparse Matrix Decomposition for DCT-II Transform

First, the block-wise inverse sparse matrix decomposition for the DCT-II transform is described. A DCT-II transform matrix is given as follows.

$$[C_{m,n}]_N=c_m\sqrt{\frac{2}{N}}\cos\frac{m(2n+1)\pi}{2N}=\sqrt{\frac{2}{N}}[C_{m,n}]_N,\quad \text{where, } c_m=\begin{cases}1, & m\neq 0\\ 1/\sqrt{2}, & m=0,\end{cases}\quad m,n=0,1,\ldots,N-1 \tag{1}$$

A 2×2 matrix which is a basic matrix is given by $$[C]_2=\begin{bmatrix}\frac{1}{\sqrt{2}} & \frac{1}{\sqrt{2}}\\ C_4^1 & C_4^3\end{bmatrix}=\begin{bmatrix}\frac{1}{\sqrt{2}} & \frac{1}{\sqrt{2}}\\ \frac{1}{\sqrt{2}} & -\frac{1}{\sqrt{2}}\end{bmatrix}=\frac{1}{\sqrt{2}}\begin{bmatrix}1 & 1\\ 1 & -1\end{bmatrix}=[C]_2 \tag{2}$$

where $\frac{1}{\sqrt{2}}$ can be seen as a special element-wise inverse matrix of order 1, and its inverse is $\sqrt{2}$, and $C_l^i=\cos(i\pi/l)$ is the cosine unit for DCT computations.

Further, the 4-by-4 DCT-II matrix has the form as $$[C]_4=\sqrt{\frac{2}{4}}\begin{bmatrix}\frac{1}{\sqrt{2}} & \frac{1}{\sqrt{2}} & \frac{1}{\sqrt{2}} & \frac{1}{\sqrt{2}}\\ C_8^1 & C_8^3 & C_8^5 & C_8^7\\ C_8^2 & C_8^6 & C_8^6 & C_8^2\\ C_8^3 & C_8^7 & C_8^1 & C_8^5\end{bmatrix}=\frac{1}{\sqrt{2}}\begin{bmatrix}\frac{1}{\sqrt{2}} & \frac{1}{\sqrt{2}} & \frac{1}{\sqrt{2}} & \frac{1}{\sqrt{2}}\\ C_8^1 & C_8^3 & -C_8^3 & -C_8^1\\ C_8^2 & -C_8^2 & -C_8^2 & C_8^2\\ C_8^3 & -C_8^1 & C_8^1 & -C_8^3\end{bmatrix}=\frac{1}{\sqrt{2}}[C]_4 \tag{3}$$

We can write $$[Pr]_4[C]_4 = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \frac{1}{\sqrt{2}} \begin{bmatrix} \frac{1}{\sqrt{2}} & \frac{1}{\sqrt{2}} & \frac{1}{\sqrt{2}} & \frac{1}{\sqrt{2}} \\ C_8^1 & C_8^3 & -C_8^3 & -C_8^1 \\ C_8^2 & -C_8^2 & -C_8^2 & C_8^2 \\ C_8^3 & -C_8^1 & C_8^1 & -C_8^3 \end{bmatrix} = \frac{1}{\sqrt{2}} \begin{bmatrix} \frac{1}{\sqrt{2}} & \frac{1}{\sqrt{2}} & \frac{1}{\sqrt{2}} & \frac{1}{\sqrt{2}} \\ C_8^2 & -C_8^2 & -C_8^2 & C_8^2 \\ C_8^1 & C_8^3 & -C_8^3 & -C_8^1 \\ C_8^3 & -C_8^1 & C_8^1 & -C_8^3 \end{bmatrix} \quad (4)$$

$$\text{where } [Pr]_4 = \begin{bmatrix} 1 & 0 & 0 & 0 \\ 0 & 0 & 1 & 0 \\ 0 & 1 & 0 & 0 \\ 0 & 0 & 0 & 1 \end{bmatrix}$$

is permutation matrix. $[\mathrm{Pr}]_N$ Permutation matrix is a special case, which has the form $$[Pr]_2 = [I]_2 \text{ and}$$

$$[Pr]_N = \begin{bmatrix} 1 & 0 & 0 & \ldots & 0 & 0 & \ldots & 0 \\ 0 & 0 & 0 & \ldots & 1 & 0 & \ldots & 0 \\ 0 & 1 & 0 & & 0 & 0 & \ldots & 0 \\ 0 & 0 & 0 & & 0 & 1 & & 0 \\ 0 & 0 & 1 & & 0 & 0 & & 0 \\ 0 & 0 & 0 & & 0 & 0 & \ddots & 0 \\ 0 & 0 & 0 & \ddots & 0 & 0 & & 0 \\ 0 & 0 & 0 & 0 & 0 & 0 & & 1 \end{bmatrix}, N \geq 4,$$

$$\text{where } [Pr]_N = [pr_{i,j}]_N,$$

$$\text{with } \begin{cases} pr_{i,j} = 1, & \text{if } i = 2j, 0 \leq j \leq \frac{N}{2} - 1, \\ pr_{i,j} = 1, & \text{if } i = (2j+1)\bmod N, \frac{N}{2} \leq j \leq N - 1, \\ pr_{i,j} = 0, & \text{others.} \end{cases}$$

$$\text{where } i, j \in \{0, 1, \ldots, N-1\}.$$

Let us define a column permutation matrix $$[Pc]_4 = \begin{bmatrix} 1 & 0 & 0 & 0 \\ 0 & 1 & 0 & 0 \\ 0 & 0 & 0 & 1 \\ 0 & 0 & 1 & 0 \end{bmatrix},$$

and $[\mathrm{Pc}]_N$ is a reversible permutation matrix, which is defined by $$[Pc]_2 = [I]_2, \text{ and} \quad (5)$$

$$[Pc]_N = \begin{bmatrix} I_{N/4} & 0 & 0 & 0 \\ 0 & I_{N/4} & 0 & 0 \\ 0 & 0 & 0 & I_{N/4} \\ 0 & 0 & I_{N/4} & 0 \end{bmatrix}, N \geq 4.$$

Thus the matrix decomposition is the form of the matrix product of diagonal block-wise inverse Jacket sparse and Hadamard matrix, $$[\tilde{C}]_4 = [Pr]_4[C]_4[Pc]_4 \quad (6)$$

$$= \frac{1}{\sqrt{2}} \begin{bmatrix} \frac{1}{\sqrt{2}} & \frac{1}{\sqrt{2}} & \frac{1}{\sqrt{2}} & \frac{1}{\sqrt{2}} \\ C_8^2 & -C_8^2 & -C_8^2 & C_8^2 \\ C_8^1 & C_8^3 & -C_8^3 & -C_8^1 \\ C_8^3 & -C_8^1 & C_8^1 & -C_8^3 \end{bmatrix} \begin{bmatrix} 1 & 0 & 0 & 0 \\ 0 & 1 & 0 & 0 \\ 0 & 0 & 0 & 1 \\ 0 & 0 & 1 & 0 \end{bmatrix}$$

$$= \frac{1}{\sqrt{2}} \begin{bmatrix} \frac{1}{\sqrt{2}} & \frac{1}{\sqrt{2}} & \frac{1}{\sqrt{2}} & \frac{1}{\sqrt{2}} \\ C_8^2 & -C_8^2 & C_8^2 & -C_8^2 \\ C_8^1 & C_8^3 & C_8^1 & -C_8^3 \\ C_8^3 & -C_8^1 & -C_8^3 & C_8^1 \end{bmatrix}$$

$$= \frac{1}{\sqrt{2}} \begin{bmatrix} C_2 & C_2 \\ B_2 & -B_2 \end{bmatrix}$$

$$= \frac{1}{\sqrt{2}} \begin{bmatrix} C_2 & 0 \\ 0 & B_2 \end{bmatrix} \begin{bmatrix} I_2 & I_2 \\ I_2 & -I_2 \end{bmatrix},$$

Where $$[C]_2 = \begin{bmatrix} \frac{1}{\sqrt{2}} & \frac{1}{\sqrt{2}} \\ \frac{1}{\sqrt{2}} & -\frac{1}{\sqrt{2}} \end{bmatrix},$$

the 2-by-2 DCT-II matrix and $$[B]_2 = \begin{bmatrix} C_8^1 & C_8^3 \\ C_8^3 & -C_8^1 \end{bmatrix}.$$

Then we can write that it is clear that $$\begin{bmatrix} C_2 & 0 \\ 0 & B_2 \end{bmatrix}$$

is a diagonal block-wise inverse Jacket matrix, which has $$\begin{bmatrix} C_2 & 0 \\ 0 & B_2 \end{bmatrix}^{-1} = \begin{bmatrix} (C_2)^{-1} & 0 \\ 0 & (B_2)^{-1} \end{bmatrix}. \quad (7)$$

In a general, the permuted DCT-II matrix $[\tilde{C}]_N$ can be constructed recursively by using $$[\tilde{C}]_N = [Pr]_N[C]_N[Pc]_N \quad (8)$$

$$= [Pr]_N \sqrt{\frac{2}{N}} [C]_N [Pc]_N$$

$$= \sqrt{\frac{2}{N}} [Pr]_N \begin{bmatrix} C_{N/2} & 0 \\ 0 & B_{N/2} \end{bmatrix} \begin{bmatrix} I_{N/2} & I_{N/2} \\ I_{N/2} & -I_{N/2} \end{bmatrix} [Pc]_N$$

where $[\mathrm{C}]_{N/2}$ denotes the $$\frac{N}{2} \times \frac{N}{2}$$

DCT-II matrix, and $[B]_{N/2}$ can be calculated by using $$[B]_{N/2} = \left[(C_{2N}^{f(m,n)})_{m,n}\right]_{N/2}, \tag{9}$$

$$\text{where } \begin{cases} f(m, 1) = 2m - 1, \\ f(m, n+1) = f(m, n) + f(m, 1) \times 2, \end{cases} \tag{10}$$

$$m, n \in \{1, 2, \ldots, N/2\}.$$

For example, in the 4-by-4 permuted DCT-II matrix $\lfloor\tilde{C}\rfloor_4$, $B_2$ could be calculated by using $f(1,1)=1$, $f(2,1)=3$, $f(1,2)=f(1,1)+f(1,1)\times 2=3$, and $f(2,2)=f(2,1)+f(2,2)=f(2,1)+f(2,1)\times 2=9$, $$\begin{aligned} [B]_2 &= \left[(C_8^{f(m,n)})_{m,n}\right]_4 \\ &= \begin{bmatrix} (C_8^{f(1,1)})_{1,2} & (C_8^{f(1,2)})_{1,2} \\ (C_8^{f(2,1)})_{2,1} & (C_8^{f(2,2)})_{2,2} \end{bmatrix} \\ &= \begin{bmatrix} C_8^1 & C_8^3 \\ C_8^3 & C_8^9 \end{bmatrix} \\ &= \begin{bmatrix} C_8^1 & C_8^3 \\ C_8^3 & -C_8^1 \end{bmatrix}. \end{aligned} \tag{11}$$

From Eq. (8), the inverse of $\lfloor\tilde{C}\rfloor_N$ can be computed from the block-wise inverse $$\begin{aligned} [C]_N^{-1} &= ([Pr]_N[C]_N[Pc])^{-1} \\ &= \left(\sqrt{\frac{2}{N}}\,[Pr]_N\begin{bmatrix} C_{N/2} & 0 \\ 0 & B_{N/2} \end{bmatrix}\begin{bmatrix} I_{N/2} & I_{N/2} \\ I_{N/2} & -I_{N/2} \end{bmatrix}[Pc]_N\right)^{-1} \\ &= \frac{2}{N}[Pc]_N^{-1}\begin{bmatrix} I_{N/2} & I_{N/2} \\ I_{N/2} & -I_{N/2} \end{bmatrix}\begin{bmatrix} C_{N/2}^{-1} & 0 \\ 0 & B_{N/2}^{-1} \end{bmatrix}[Pr]_N^{-1}. \end{aligned} \tag{12}$$

Moreover, the matrix $$[B]_2 = \begin{bmatrix} C_8^1 & C_8^3 \\ C_8^3 & -C_8^1 \end{bmatrix}$$

can be decomposed by using the 2-by-2 DCT-II matrix as $$\begin{aligned} [B]_2 &= \begin{bmatrix} C_8^1 & C_8^3 \\ C_8^3 & -C_8^1 \end{bmatrix}, \\ &= [L]_2[C]_2[D]_2 \\ &= \begin{bmatrix} \sqrt{2} & 0 \\ -\sqrt{2} & 2 \end{bmatrix}\begin{bmatrix} \frac{1}{\sqrt{2}} & \frac{1}{\sqrt{2}} \\ C_8^2 & -C_8^2 \end{bmatrix}\begin{bmatrix} C_8^1 & 0 \\ 0 & C_8^3 \end{bmatrix} \end{aligned} \tag{13}$$

where $$[L]_2 = \begin{bmatrix} \sqrt{2} & 0 \\ -\sqrt{2} & 2 \end{bmatrix}$$

is a lower triangular matrix, $$[D]_2 = \begin{bmatrix} C_8^1 & 0 \\ 0 & C_8^3 \end{bmatrix}$$

is a diagonal matrix, and we use the cosine related function $$\cos(2k+1)\phi_m = 2\cos(2k\phi_m)\cos\phi_m - \cos(2k-1)\phi_m. \quad \text{where, } \phi_m \text{ is m-th angle} \tag{14}$$

We note that $$[B]_N = [L]_N[C]_N[D]_N \tag{15}$$

where, $$[L]_N = \begin{bmatrix} \sqrt{2} & 0 & 0 & \ldots \\ -\sqrt{2} & 2 & 0 & \ldots \\ \sqrt{2} & -2 & 2 & \ldots \\ \vdots & \vdots & & \ddots \end{bmatrix},$$

$$[D]_N = \begin{bmatrix} C_{4N}^{\Phi_0} & 0 & \ldots & 0 \\ 0 & C_{4N}^{\Phi_1} & & \vdots \\ \vdots & & \ddots & 0 \\ 0 & \ldots & 0 & C_{4N}^{\Phi_{N-1}} \end{bmatrix},$$

$$\text{and } \Phi_i = 2i+1, \in\{0,1,2,\ldots,N-1\}. \tag{16}$$

Proof: In case of the N×N DCT-II matrix, $[C]_N$ can be represented by using the form as $$[C]_N = \begin{bmatrix} \frac{1}{\sqrt{2}} & \frac{1}{\sqrt{2}} & \frac{1}{\sqrt{2}} & \ldots & \frac{1}{\sqrt{2}} & \frac{1}{\sqrt{2}} \\ C_{4N}^{2k_0\Phi_0} & C_{4N}^{2k_0\Phi_1} & C_{4N}^{2k_0\Phi_2} & \ldots & C_{4N}^{2k_0\Phi_{N-2}} & C_{4N}^{2k_0\Phi_{N-1}} \\ C_{4N}^{2k_1\Phi_0} & C_{4N}^{2k_1\Phi_1} & C_{4N}^{2k_1\Phi_2} & \ldots & C_{4N}^{2k_1\Phi_{N-2}} & C_{4N}^{2k_1\Phi_{N-1}} \\ C_{4N}^{2k_2\Phi_0} & C_{4N}^{2k_2\Phi_1} & C_{4N}^{2k_2\Phi_2} & \ldots & C_{4N}^{2k_2\Phi_{N-2}} & C_{4N}^{2k_2\Phi_{N-1}} \\ \vdots & & & \vdots & & \vdots \\ C_{4N}^{2k_{N-2}\Phi_0} & C_{4N}^{2k_{N-2}\Phi_1} & C_{4N}^{2k_{N-2}\Phi_2} & \ldots & C_{4N}^{2k_{N-2}\Phi_{N-2}} & C_{4N}^{2k_{N-2}\Phi_{N-1}} \end{bmatrix}, \tag{17}$$

where $k_i=i+1$, $i\in\{0, 1, 2, \ldots\}$.

According to (10), a N×N matrix $[B]_N$ from $[C]_{2N}$ can be represented $$[B]_N = \begin{bmatrix} C_{4N}^{\Phi_0} & C_{4N}^{\Phi_1} & C_{4N}^{\Phi_2} & \ldots & C_{4N}^{\Phi_{N-1}} \\ C_{4N}^{(2k_0+1)\Phi_0} & C_{4N}^{(2k_0+1)\Phi_1} & C_{4N}^{(2k_0+1)\Phi_2} & \ldots & C_{4N}^{(2k_0+1)\Phi_{N-1}} \\ C_{4N}^{(2k_1+1)\Phi_0} & C_{4N}^{(2k_1+1)\Phi_1} & C_{4N}^{(2k_1+1)\Phi_2} & \ldots & C_{4N}^{(2k_1+1)\Phi_{N-1}} \\ \vdots & & \vdots & & \vdots \\ C_{4N}^{(2k_{N-2}+1)\Phi_0} & C_{4N}^{(2k_{N-2}+1)\Phi_1} & C_{4N}^{(2k_{N-2}+1)\Phi_2} & \ldots & C_{4N}^{(2k_{N-2}+1)\Phi_{N-1}} \end{bmatrix}, \tag{18}$$

Based on Eq. (14), we have the formula $$C_{4N}^{(2k_i+1)\Phi_m} = 2C_{4N}^{2k_i\Phi_m}C_{4N}^{101\ m} - C_{4N}^{(2k_i-1)\Phi_m} = -C_{4N}^{(2k_i-1)\Phi_m} + 2C_{4N}^{2k_i\Phi_m}C_{4N}^{101\ m}, \tag{19}$$

where, $m \in\{0, 1, 2, \ldots\}$.

Thus we can calculate $$
[L]_N[C]_N[D]_N = \begin{bmatrix} \sqrt{2} & 0 & 0 & 0 & \dots & 0 \\ -\sqrt{2} & 2 & 0 & 0 & & 0 \\ \sqrt{2} & -2 & 2 & 0 & & 0 \\ -\sqrt{2} & 2 & -2 & 2 & \dots & \vdots \\ \sqrt{2} & -2 & 2 & -2 & 2 & \\ \vdots & & & & & \ddots \end{bmatrix} \begin{bmatrix} \frac{1}{\sqrt{2}} & \frac{1}{\sqrt{2}} & \frac{1}{\sqrt{2}} & \dots & \frac{1}{\sqrt{2}} & \frac{1}{\sqrt{2}} \\ C_{4N}^{2k_0\Phi_0} & C_{4N}^{2k_0\Phi_1} & C_{4N}^{2k_0\Phi_2} & \dots & C_{4N}^{2k_0\Phi_{N-2}} & C_{4N}^{2k_0\Phi_{N-1}} \\ C_{4N}^{2k_1\Phi_0} & C_{4N}^{2k_1\Phi_1} & C_{4N}^{2k_1\Phi_2} & \dots & C_{4N}^{2k_1\Phi_{N-2}} & C_{4N}^{2k_1\Phi_{N-1}} \\ C_{4N}^{2k_2\Phi_0} & C_{4N}^{2k_2\Phi_1} & C_{4N}^{2k_2\Phi_2} & \dots & C_{4N}^{2k_2\Phi_{N-2}} & C_{4N}^{2k_2\Phi_{N-1}} \\ \vdots & & \vdots & & & \vdots \\ C_{4N}^{2k_{N-2}\Phi_0} & C_{4N}^{2k_{N-2}\Phi_1} & C_{4N}^{2k_{N-2}\Phi_2} & \dots & C_{4N}^{2k_{N-2}\Phi_{N-2}} & C_{4N}^{2k_{N-2}\Phi_{N-1}} \end{bmatrix} \tag{20}
$$

$$
\begin{bmatrix} C_{4N}^{\Phi_0} & 0 & \dots & 0 \\ 0 & C_{4N}^{\Phi_1} & & \vdots \\ \vdots & & \ddots & 0 \\ 0 & \dots & 0 & C_{4N}^{\Phi_{N-1}} \end{bmatrix}
$$

$$
= \begin{bmatrix} 1 & 1 & \dots & 1 \\ -1+2C_{4N}^{2k_0\Phi_0} & -1+2C_{4N}^{2k_0\Phi_1} & \dots & -1+2C_{4N}^{2k_0\Phi_{N-1}} \\ 1-2C_{4N}^{2k_0\Phi_0}+2C_{4N}^{2k_1\Phi_0} & 1-2C_{4N}^{2k_0\Phi_1}+2C_{4N}^{2k_1\Phi_1} & \dots & 1-2C_{4N}^{2k_0\Phi_{N-1}}+2C_{4N}^{2k_1\Phi_{N-2}} \\ \vdots & & & \vdots \end{bmatrix}
$$

$$
\begin{bmatrix} C_{4N}^{\Phi_0} & 0 & \dots & 0 \\ 0 & C_{4N}^{\Phi_1} & & \vdots \\ \vdots & & \ddots & 0 \\ 0 & \dots & 0 & C_{4N}^{\Phi_{N-1}} \end{bmatrix}
$$

$$
= \begin{bmatrix} C_{4N}^{\Phi_0} & C_{4N}^{\Phi_1} & \dots & C_{4N}^{\Phi_{N-1}} \\ -C_{4N}^{\Phi_0}+2C_{4N}^{2k_0\Phi_0}C_{4N}^{\Phi_0} & -C_{4N}^{\Phi_1}+2C_{4N}^{2k_0\Phi_1}C_{4N}^{\Phi_1} & \dots & -C_{4N}^{\Phi_{N-1}}+2C_{4N}^{2k_0\Phi_{N-1}}C_{4N}^{\Phi_{N-1}} \\ C_{4N}^{\Phi_0}-2C_{4N}^{2k_0\Phi_0}C_{4N}^{\Phi_0}+2C_{4N}^{2k_1\Phi_0}C_{4N}^{\Phi_0} & C_{4N}^{\Phi_1}-2C_{4N}^{2k_0\Phi_1}C_{4N}^{\Phi_1}+2C_{4N}^{2k_1\Phi_1}C_{4N}^{\Phi_1} & \dots & \\ \vdots & & & \vdots \end{bmatrix}
$$

Since $k_0=1$, we get $$
-C_{4N}^{\Phi_m}+2C_{4N}^{2k_0\Phi_m}C_{4N}^{\Phi_m}=-C_{4N}^{(2k_0-1)\Phi_m}+2C_{4N}^{2k_0\Phi_m}C_{4N}^{\Phi_m}=C_{4N}^{(2k_0+1)\Phi_m}, \text{ and} \tag{21}
$$

$$
C_{4N}^{\Phi_m}-2C_{4N}^{2k_0\Phi_m}C_{4N}^{\Phi_m}=-(-C_{4N}^{(2k_0-1)\Phi_m}+2C_{4N}^{2k_0\Phi_m}C_{4N}^{\Phi_m})=-C_{4N}^{(2k_0+1)\Phi_m} \tag{22}
$$

In case of $k_i=i+1$, we have $(2k_{i-1}+1)\Phi_m=(2(k_i-1)+1)\Phi_m=(2k_i-1)\Phi_m$, then we get $$
C_{4N}^{\Phi_m}-2C_{4N}^{2k_{i-1}\Phi_m}C_{4N}^{\Phi_m}+2C_{4N}^{2k_i\Phi_m}C_{4N}^{\Phi_m}=-C_{4N}^{(2k_{i-1}+1)\Phi_m}+2C_{4N}^{2k_i\Phi_m}C_{4N}^{\Phi_m}=-C_{4N}^{(2k_i-1)\Phi_m}+2C_{4N}^{2k_i\Phi_m}C_{4N}^{\Phi_m}=C_{4N}^{(2k_i+1)\Phi_m} \tag{23}
$$

Taking the (21)-(23) to (20), we can rewrite $$
[L]_N[C]_N[D]_N = \begin{bmatrix} C_{4N}^{\Phi_0} & C_{4N}^{\Phi_1} & \dots & C_{4N}^{\Phi_{N-1}} \\ -C_{4N}^{\Phi_0}+2C_{4N}^{2k_0\Phi_0}C_{4N}^{\Phi_0} & -C_{4N}^{\Phi_1}+2C_{4N}^{2k_0\Phi_1}C_{4N}^{\Phi_1} & \dots & -C_{4N}^{\Phi_{N-1}}+2C_{4N}^{2k_0\Phi_{N-1}}C_{4N}^{\Phi_{N-1}} \\ C_{4N}^{\Phi_0}-2C_{4N}^{2k_0\Phi_0}C_{4N}^{\Phi_0}+2C_{4N}^{2k_1\Phi_0}C_{4N}^{\Phi_0} & C_{4N}^{\Phi_1}-2C_{4N}^{2k_0\Phi_1}C_{4N}^{\Phi_1}+2C_{4N}^{2k_1\Phi_1}C_{4N}^{\Phi_1} & \dots & \\ \vdots & & & \vdots \end{bmatrix} \tag{24}
$$

$$
= \begin{bmatrix} C_{4N}^{\Phi_0} & C_{4N}^{\Phi_1} & \dots & C_{4N}^{\Phi_{N-1}} \\ C_{4N}^{(2k_0+1)\Phi_0} & C_{4N}^{(2k_0+1)\Phi_1} & \dots & C_{4N}^{(2k_0+1)\Phi_{N-1}} \\ C_{4N}^{(2k_1+1)\Phi_0} & C_{4N}^{(2k_1+1)\Phi_1} & \dots & C_{4N}^{(2k_1+1)\Phi_{N-1}} \\ \vdots & & & \vdots \end{bmatrix}
$$

$$
= [B]_N.
$$

The proof of (15) is completed.

By using the results from (8) and (15), we have a new form for the DCT-II matrix $$
[\tilde{C}] = \sqrt{\frac{2}{N}}\,[Pr]_N \begin{bmatrix} C_{N/2} & 0 \\ 0 & L_{N/2}C_{N/2}D_{N/2} \end{bmatrix} \begin{bmatrix} I_{N/2} & I_{N/2} \\ I_{N/2} & -I_{N/2} \end{bmatrix} [Pc]_N \tag{25}
$$

$$
= \sqrt{\frac{2}{N}}\,[Pr]_N \begin{bmatrix} I_{N/2} & 0 \\ 0 & L_{N/2} \end{bmatrix} [I_2 \otimes C_{N/2}] \begin{bmatrix} I_{N/2} & 0 \\ 0 & D_{N/2} \end{bmatrix}
$$

$$
\begin{bmatrix} I_{N/2} & I_{N/2} \\ I_{N/2} & -I_{N/2} \end{bmatrix} [Pc]_N
$$

Then, based on the recursive 4×4 kernel $\overline{c}_4$ form, we have $$[C]_N = [Pr]_N \begin{bmatrix} I_{N/2} & 0 \\ 0 & L_{N/2} \end{bmatrix} [I_2 \otimes C_{N/2}] \begin{bmatrix} I_{N/2} & 0 \\ 0 & D_{N/2} \end{bmatrix} \begin{bmatrix} I_{N/2} & I_{N/2} \\ I_{N/2} & -I_{N/2} \end{bmatrix} [Pc]_N \tag{26}$$

$$= [Pr]_N \begin{bmatrix} I_{N/2} & 0 \\ 0 & L_{N/2} \end{bmatrix} \left[ I_2 \otimes \underbrace{\left[ \ldots \left[ I_2 \otimes \underbrace{\left[ [Pr]_4 \begin{bmatrix} I_2 & 0 \\ 0 & L_2 \end{bmatrix} [I_2 \otimes C_2] \begin{bmatrix} I_2 & 0 \\ 0 & D_2 \end{bmatrix} \begin{bmatrix} I_2 & I_2 \\ I_2 & -I_2 \end{bmatrix} [Pc]_4 \right]}_{C_4} \right] \ldots \right]}_{C_{N/2}} \right]$$

$$\begin{bmatrix} I_{N/2} & 0 \\ 0 & D_{N/2} \end{bmatrix} \begin{bmatrix} I_{N/2} & I_{N/2} \\ I_{N/2} & -I_{N/2} \end{bmatrix} [Pc]_N$$

Finally, $$[C]_N = \sqrt{\frac{2}{N}} [Pr]_N \begin{bmatrix} I_{N/2} & 0 \\ 0 & L_{N/2} \end{bmatrix} \begin{bmatrix} I_2 \otimes \\ Pr_{N/2} \end{bmatrix} \begin{bmatrix} I_2 \otimes \\ \begin{bmatrix} I_{N/4} & 0 \\ 0 & L_{N/4} \end{bmatrix} \end{bmatrix} \begin{bmatrix} I_4 \otimes \\ Pr_{N/4} \end{bmatrix} \tag{27}$$

$$\begin{bmatrix} I_4 \otimes \\ \begin{bmatrix} I_{N/8} & 0 \\ 0 & L_{N/8} \end{bmatrix} \end{bmatrix} \ldots \begin{bmatrix} I_{N/4} \otimes \\ Pr_4 \end{bmatrix} \begin{bmatrix} I_{N/4} \otimes \\ \begin{bmatrix} I_2 & 0 \\ 0 & L_2 \end{bmatrix} \end{bmatrix} \begin{bmatrix} I_{N/2} \otimes \\ C_2 \end{bmatrix} \begin{bmatrix} I_{N/4} \otimes \\ \begin{bmatrix} I_2 & 0 \\ 0 & D_2 \end{bmatrix} \end{bmatrix} \begin{bmatrix} I_{N/4} \otimes \\ \begin{bmatrix} I_2 & I_2 \\ I_2 & -I_2 \end{bmatrix} \end{bmatrix} \begin{bmatrix} I_{N/4} \otimes \\ Pc_4 \end{bmatrix} \ldots \begin{bmatrix} I_4 \otimes \\ \begin{bmatrix} I_{N/8} & 0 \\ 0 & D_{N/8} \end{bmatrix} \end{bmatrix}$$

$$\begin{bmatrix} I_4 \otimes \\ \begin{bmatrix} I_{N/8} & I_{N/8} \\ I_{N/8} & -I_{N/8} \end{bmatrix} \end{bmatrix} \begin{bmatrix} I_4 \otimes \\ Pc_{N/4} \end{bmatrix} \begin{bmatrix} I_2 \otimes \\ \begin{bmatrix} I_{N/4} & 0 \\ 0 & D_{N/4} \end{bmatrix} \end{bmatrix} \begin{bmatrix} I_4 \otimes \\ \begin{bmatrix} I_{N/4} & I_{N/4} \\ I_{N/4} & -I_{N/4} \end{bmatrix} \end{bmatrix} \begin{bmatrix} I_2 \otimes \\ Pc_{N/2} \end{bmatrix} \begin{bmatrix} I_{N/2} & 0 \\ 0 & D_{N/2} \end{bmatrix} \begin{bmatrix} I_{N/2} & I_{N/2} \\ I_{N/2} & -I_{N/2} \end{bmatrix} [Pc]_N$$

Figure 1B:
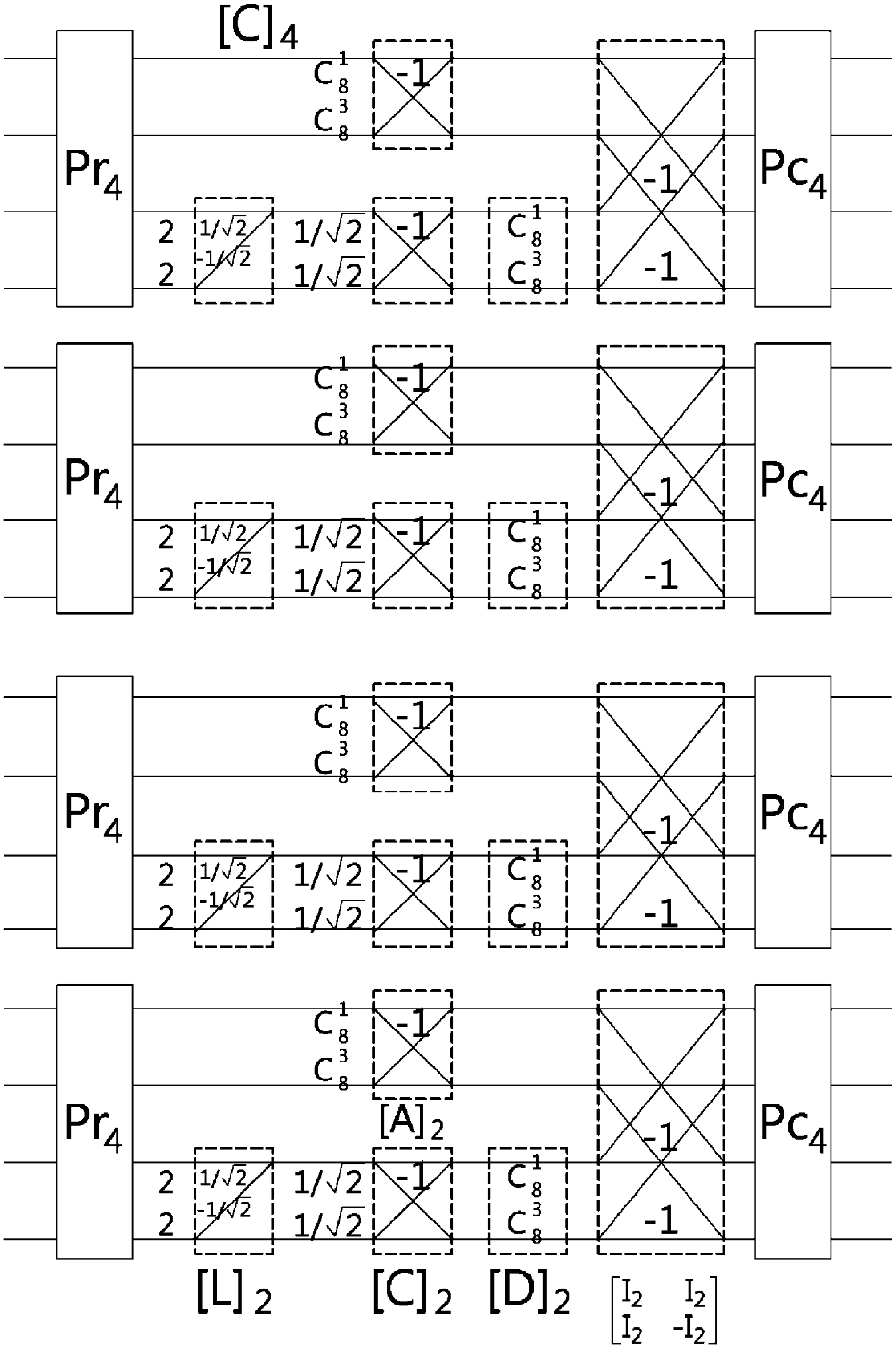
Figure 1C:
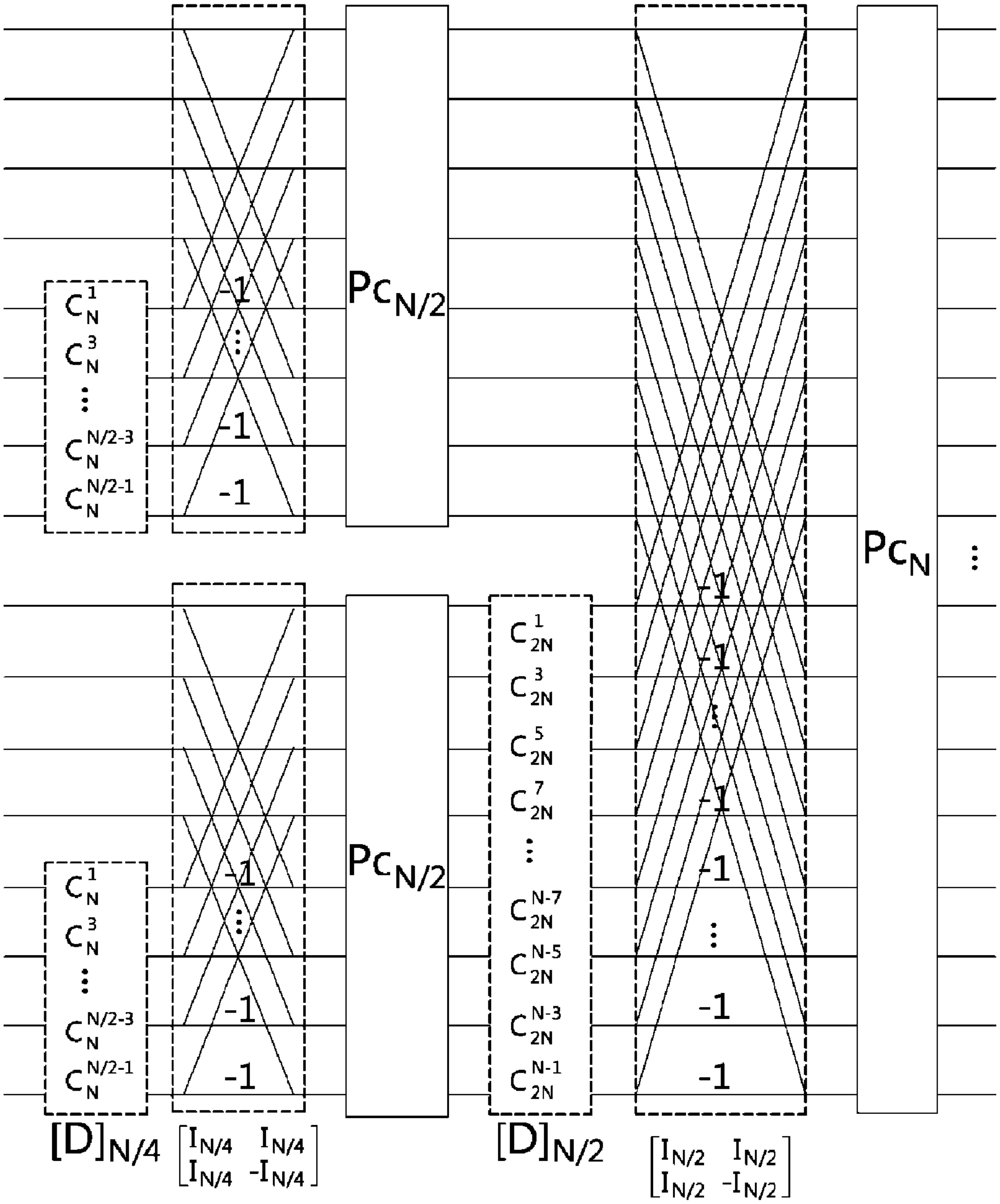

FIG. 1A-1C is a butterfly data flow graph of Equation (27) according to an exemplary embodiment of the present invention. As shown in FIG. 1A-1C, the data flow of Equation (27) is represented.

III. Block-Wise Inverse Sparse Matrix Decomposition for DST-II

Similar fashion as the DCT-II, the DST-II matrix is given by $$[S_{m,n}]_N = s_m \sqrt{\frac{2}{N}} \sin\frac{\pi(m+1)(2n+1)}{2N} = \sqrt{\frac{2}{N}} [S_{m,n}]_N \tag{28}$$

$$s_m = \begin{cases} 1, & m \neq N-1 \\ 1/\sqrt{2}, & m = N-1 \end{cases},$$

$$m, n = 0, 1, \ldots, N-1.$$

The basic form of the DCT-II 2×2 matrix is given by $$[S]_2 = \frac{1}{\sqrt{2}} \begin{bmatrix} 1 & 1 \\ 1 & -1 \end{bmatrix} = [S]_2. \tag{29}$$

The general N×N DST-II matrix is given by $$[S]_N = \sqrt{\frac{2}{N}} \begin{bmatrix} S_{4N}^{2k_0\Phi_0} & S_{4N}^{2k_0\Phi_1} & \ldots & S_{4N}^{2k_0\Phi_{N-1}} \\ S_{4N}^{2k_1\Phi_0} & S_{4N}^{2k_1\Phi_1} & \ldots & S_{4N}^{2k_1\Phi_{N-1}} \\ \vdots & \vdots & \ddots & \vdots \\ S_{4N}^{2k_{N-2}\Phi_0} & S_{4N}^{2k_{N-2}\Phi_1} & \ldots & S_{4N}^{2k_{N-2}\Phi_{N-1}} \\ 1/\sqrt{2} & -1/\sqrt{2} & & -1\sqrt{2} \end{bmatrix} = \sqrt{\frac{2}{N}} [S]_N \tag{30}$$

where $S_l^k = \sin(k\pi/l)$, $k_i = i+1$, $\Phi_j = 2j+1$, i=0, 1, . . . , N−2, j=0, 1, . . . , N−1

As such, the DST-II matrix is decomposed based on the Jacket matrix by multiplying the same permutation matrices. Herein, the row permutation matrix is defined as $$[Ps]_N = [Ps_{i,j}]_N = \begin{cases} 1, \text{ if } & j = (2i+1)\bmod N,\ 0 \le i \le N/2 - 1 \\ 1, \text{ if } & j = (2i)\bmod N,\ N/2 \le i \le N-1 \\ 0, & \text{others} \end{cases},$$

$$i, j = 0, 1 \ldots, N-1.$$

Using Equation (30), we can obtain the 4×4 sparse matrix similar fashion the DCT-II of Equation (6) as follows:

$$[\mathbb{S}]_4 = [Pr]_4 [S]_4 [Pc]_4 = \frac{1}{\sqrt{2}} \begin{bmatrix} A_2 & A_2 \\ S_2 & -S_2 \end{bmatrix} = \frac{1}{\sqrt{2}} \begin{bmatrix} A_2 & 0 \\ 0 & S_2 \end{bmatrix} \begin{bmatrix} I_2 & I_2 \\ I_2 & -I_2 \end{bmatrix} \tag{31}$$

where $$[A]_2 = \begin{bmatrix} S_8^1 & S_8^1 \\ S_8^3 & -S_8^1 \end{bmatrix}$$

Likewise, an 8×8 permuted matrix can be given by $$[\mathbb{S}]_8 = [Pr]_8 [S]_8 [Pc]_8 = \frac{1}{2} \begin{bmatrix} A_4 & -A_4 \\ S_4 & S_4 \end{bmatrix} = \frac{1}{2} \begin{bmatrix} A_4 & 0 \\ 0 & S_4 \end{bmatrix} \begin{bmatrix} I_4 & I_4 \\ I_4 & -I_4 \end{bmatrix}, \tag{32}$$

-continued where $$[A]_4 = \begin{bmatrix} S_{16}^1 & S_{16}^3 & S_{16}^5 & S_{16}^7 \\ S_{16}^3 & S_{16}^7 & S_{16}^1 & -S_{16}^5 \\ S_{16}^5 & S_{16}^1 & -S_{16}^7 & S_{16}^3 \\ S_{16}^7 & -S_{16}^5 & S_{16}^3 & -S_{16}^1 \end{bmatrix}.$$

In general, the N×N DST-II matrix can be given by $$[S]_N = \sqrt{\frac{2}{N}} \begin{bmatrix} S_{4N}^{2k_0\phi_0} & S_{4N}^{2k_0\phi_1} & \ldots & S_{4N}^{2k_0\phi_{N-1}} \\ S_{4N}^{2k_1\phi_0} & S_{4N}^{2k_1\phi_1} & \ldots & S_{4N}^{2k_1\phi_{N-1}} \\ \vdots & \vdots & \ldots & \vdots \\ S_{4N}^{2k_{N-2}\phi_0} & S_{4N}^{2k_{N-2}\phi_1} & \ldots & S_{4N}^{2k_{N-2}\phi_{N-1}} \\ 1/\sqrt{2} & -1/\sqrt{2} & \ldots & -1/\sqrt{2} \end{bmatrix} = \sqrt{\frac{2}{N}}\,[S]_N \tag{33}$$

where $$\begin{aligned}[S_{m,n}]_N &= [s_{i,j} S_{2n}^{(m+1)(2n+1)}] \\ &= [s_{i,j} S_{4N}^{(m+1)(2n+1)}] \\ &= \left[s_{i,j} S_{4N}^{2k_i\phi_j}\right]_N,\end{aligned}$$

where $$\begin{cases} k_i = i+1 \\ \phi_j = 2j+1 \end{cases},\quad s_{i,j} = \begin{cases} 1, & i \neq N-1 \\ 1/\sqrt{2}, & i = N-1 \end{cases},$$

$$m, n, i, j = 0, 1 \ldots, N-1.$$

The N×N permuted DST-II matrix $[S]_N$ can be recursively formed by using $$\begin{aligned}[\hat{S}]_N &= [Pr]_N [S]_N [Pc]_N \\ &= \sqrt{\frac{2}{N}} \begin{bmatrix} A_{N/2} & 0 \\ 0 & S_{N/2} \end{bmatrix} \begin{bmatrix} I_{N/2} & I_{N/2} \\ I_{N/2} & -I_{N/2} \end{bmatrix}\end{aligned} \tag{34}$$

A submatrix $[A]_N$ is given by $$\begin{aligned}[A_{m,n}]_N &= [S_{4N}^{(2m+1)(2n+1)}] \\ &= [S_{4N}^{[2(m+1)-1](2n+1)}] \\ &= \left[S_{4N}^{(2k_1-1)\phi_j}\right]_N\end{aligned} \tag{35}$$

$$\begin{cases} k_i = i+1 \\ \phi_j = 2j+1 \end{cases},$$

$$m, n, i, j = 0, 1 \ldots, N-1.$$

through multiplying the row and column permutation matrices, we can obtain the decomposed matrix as the diagonal block-wise inverse Jacket sparse matrix as below:

$$\begin{bmatrix} A_4 & 0 \\ 0 & S_4 \end{bmatrix}^{-1} = \begin{bmatrix} A_4^{-1} & 0 \\ 0 & S_4^{-1} \end{bmatrix}, \tag{36}$$

then, $$\begin{bmatrix} A_{N/2} & 0 \\ 0 & S_{N/2} \end{bmatrix}^{-1} = \begin{bmatrix} A_{N/2}^{-1} & 0 \\ 0 & S_{N/2}^{-1} \end{bmatrix}$$

The inverse of Equation (36) is simply calculated as below.

$$\begin{aligned}[\hat{S}]_N^{-1} &= \left(\sqrt{\frac{2}{N}} \begin{bmatrix} A_{N/2} & o \\ o & S_{N/2} \end{bmatrix} \begin{bmatrix} I_{N/2} & I_{N/2} \\ I_{N/2} & -I_{N/2} \end{bmatrix}\right)^{-1} \\ &= \sqrt{\frac{N}{2}} \times \frac{1}{2} \begin{bmatrix} I_{N/2} & I_{N/2} \\ I_{N/2} & -I_{N/2} \end{bmatrix} \begin{bmatrix} A_{N/2}^{-1} & 0 \\ 0 & S_{N/2}^{-1} \end{bmatrix}.\end{aligned} \tag{37}$$

Furthermore, it was provided follow that the submatrix $[A]_N$ can be represented by:

$$[A]_N = [U]_N [S]_N [D]_N \tag{38}$$

where $$[U]_N = \begin{bmatrix} 2 & -2 & 2 & -\sqrt{2} \\ 0 & 2 & -2 & \sqrt{2} \\ \vdots & \ddots & 2 & \vdots \\ 0 & \ldots & 0 & \sqrt{2} \end{bmatrix}_N,$$

$$[D]_N = \operatorname{diag}\left[C_{4N}^{\Phi_0}, \ldots, C_4^{\Phi_{N-1}}\right]_N \Phi_i = 2i+1,\ i = 0, 1, \ldots, N-1.$$

and $[U]_N$ is an upper triangular matrix.

Similar fashion as the DCT lower triangular matrix of Eq. (16), also the matrix of the DST is upper triangular matrix and we can obtain the relationship as below:

$$[L]_N = [\bar{I}]_N [U]_N, \tag{39}$$

where $$[\bar{I}]_2 = \begin{bmatrix} 0 & 1 \\ 1 & 0 \end{bmatrix}$$

Equation (38) is proved as follows.

Using relationship of sum formula and difference formula of sine function, the following equation is expressed.

$$\begin{aligned} C_{4N}^{\phi_j} &= S_{4N}^{\phi_{N-j-1}} \\ &= S_{4N}^{(2k_{N-1}-1)\phi_j}, \end{aligned} \tag{40}$$

$$2S_{4N}^{2k_i\phi_j}C_{4N}^{\phi_j} - S_{4N}^{(2k_{i+1}-1)\phi_j} = S_{4N}^{(2k_i-1)\phi_j},$$

$$2S_{4N}^{2k_i\phi_j}C_{4N}^{\phi_j} - S_{4N}^{(2k_i-1)\phi_j} = S_{4N}^{(2k_{i+1}-1)\phi_j}$$

$$\begin{cases} \left(2S_{4N}^{(2k_0-1)\phi_j} - 2S_{4N}^{2k_1\phi_j} + \ldots + 2S_{4N}^{2k_{N-2}\phi_j} - 1\right)C_{4N}^{\phi_j} = 2S_{4N}^{(2k_0-1)\phi_j}C_{4N}^{\phi_j} - S_{4N}^{(2k_1-1)\phi_j} = S_{4N}^{(2k_0-1)\phi_j} \\ \left(2S_{4N}^{(2k_1-1)\phi_j} - 2S_{4N}^{2k_1\phi_j} + \ldots - 2S_{4N}^{2k_{N-2}\phi_j} + 1\right)C_{4N}^{\phi_j} = 2S_{4N}^{(2k_1-1)\phi_j}C_{4N}^{\phi_j} - S_{4N}^{(2k_2-1)\phi_j} = S_{4N}^{(2k_1-1)\phi_j} \\ \quad\vdots \\ \left(2S_{4N}^{(2k_{N-3}-1)\phi_j} - 2S_{4N}^{2k_{N-2}\phi_j} + 1\right)C_{4N}^{\phi_j} = 2S_{4N}^{(2k_{N-3}-1)\phi_j}C_{4N}^{\phi_j} - S_{4N}^{(2k_{N-2}-1)\phi_j} = S_{4N}^{(2k_{N-3}-1)\phi_j} \\ \left(2S_{4N}^{2k_n-2\phi_j} - 1\right)C_{4N}^{\phi_j} = 2S_{4N}^{2k_{N-2}\phi_j}C_{4N}^{\phi_j} - S_{4N}^{\phi_{N-j-1}} = 2S_{4N}^{2k_{N-2}\phi_j}C_{4N}^{\phi_j} - S_{4N}^{(2k_{N-1}-1)\phi_j} = S_{4N}^{(2k_{N-2}-1)\phi_j} \end{cases}$$

where $k_i$=i+1, $\Phi_j$=2j+1, i,j=0, 1, . . . , N−1.

By taking Equation (40) and into the right hand side of Equation (38), the following equation is obtained.

$$[U]_N[S]_N[D]_N = \begin{bmatrix} S_{4N}^{(2k_0-1)\phi_0} & S_{4N}^{(2k_0-1)\phi_1} & \ldots & S_{4N}^{(2k_0-1)\phi_{N-1}} \\ S_{4N}^{(2k_1-1)\phi_0} & S_{4N}^{(2k_1-1)\phi_1} & \ldots & S_{4N}^{(2k_1-1)\phi_{N-1}} \\ \vdots & \vdots & \ddots & \vdots \\ S_{4N}^{(2k_{N-1}-1)\phi_0} & S_{4N}^{(2k_{N-1}-1)\phi_1} & \ldots & S_{4N}^{(2k_{N-1}-1)\phi_{N-1}} \end{bmatrix} \tag{41}$$

According to Equation (35), the left hand side of Equation (38) of $[A]_N$ from $[S]_{2N}$ can be expressed by $$[A]_N = \begin{bmatrix} S_{4N}^{(2k_0-1)\phi_0} & S_{4N}^{(2k_0-1)\phi_1} & \ldots & S_{4N}^{(2k_0-1)\phi_{N-1}} \\ S_{4N}^{(2k_1-1)\phi_0} & S_{4N}^{(2k_1-1)\phi_1} & \ldots & S_{4N}^{(2k_1-1)\phi_{N-1}} \\ \vdots & \vdots & \ddots & \vdots \\ S_{4N}^{(2k_{N-1}-1)\phi_0} & S_{4N}^{(2k_{N-1}-1)\phi_1} & \ldots & S_{4N}^{(2k_{N-1}-1)\phi_{N-1}} \end{bmatrix} \tag{42}$$

It is proved that Equation (41) and Equation (42) are the same and the expression of Equation (38) is correct.

Then, the 4×4 of DST-II matrices are as shown $$\begin{aligned} [S]_4 &= \frac{1}{\sqrt{2}}[Pr]_4^{-1}\begin{bmatrix} A_2 & 0 \\ 0 & S_2 \end{bmatrix}\begin{bmatrix} I_2 & I_2 \\ I_2 & -I_2 \end{bmatrix}[Pc]_4^{-1} \\ &= \frac{1}{\sqrt{2}}[Pr]_4\begin{bmatrix} A_2 & 0 \\ 0 & S_2 \end{bmatrix}\begin{bmatrix} I_2 & I_2 \\ I_2 & -I_2 \end{bmatrix}[Pc]_4, \end{aligned} \tag{43}$$

We note that $$\begin{aligned} [S]_N &= \sqrt{\frac{N}{2}}\,[S]_N \\ &= [Pr]_N\begin{bmatrix} A_{N/2} & 0 \\ 0 & S_{N/2} \end{bmatrix}\begin{bmatrix} I_{N/2} & I_{N/2} \\ I_{N/2} & -I_{N/2} \end{bmatrix}[Pc]_N \\ &= [Pr]_N\begin{bmatrix} U_{N/2}S_{N/2}D_{N/2} & 0 \\ 0 & S_{N/2} \end{bmatrix}\begin{bmatrix} I_{N/2} & I_{N/2} \\ I_{N/2} & -I_{N/2} \end{bmatrix}[Pc]_N \\ &= [Pr]_N\begin{bmatrix} U_{N/2} & 0 \\ 0 & I_{N/2} \end{bmatrix}[I_2 \otimes S_{N/2}]\begin{bmatrix} D_{N/2} & 0 \\ 0 & I_{N/2} \end{bmatrix}\begin{bmatrix} I_{N/2} & I_{N/2} \\ I_{N/2} & -I_{N/2} \end{bmatrix}[Pc]_N \\ &= [Pr]_N\begin{bmatrix} U_{N/2} & 0 \\ 0 & I_{N/2} \end{bmatrix}\left[I_2 \otimes \underbrace{\left[\ldots I_2 \otimes \underbrace{\left[[Pr]_4\begin{bmatrix} U_2 & 0 \\ 0 & I_2 \end{bmatrix}[I_2 \otimes S_2]\begin{bmatrix} D_2 & 0 \\ 0 & I_2 \end{bmatrix}\begin{bmatrix} I_2 & I_2 \\ I_2 & -I_2 \end{bmatrix}[Pc]_4\right]}_{S_4} \ldots\right]}_{S_{N/2}}\right] \\ &\quad \begin{bmatrix} D_{N/2} & 0 \\ 0 & I_{N/2} \end{bmatrix}\begin{bmatrix} I_{N/2} & I_{N/2} \\ I_{N/2} & -I_{N/2} \end{bmatrix}[Pc]_N \end{aligned} \tag{44}$$

As a result, the general recursive form for DST-II matrix can be represented by $$\begin{aligned} [S]_N = & \\ & \sqrt{\frac{2}{N}}\,[Pr]_N\begin{bmatrix} U_{N/2} & 0 \\ 0 & I_{N/2} \end{bmatrix}[I_2 \otimes Pr_{N/2}]\left[I_2 \otimes \begin{bmatrix} U_{N/4} & 0 \\ 0 & I_{N/4} \end{bmatrix}\right][I_4 \otimes Pr_{N/4}] \\ & \left[I_4 \otimes \begin{bmatrix} U_{N/8} & 0 \\ 0 & I_{N/8} \end{bmatrix}\right] \ldots [I_{N/4} \otimes Pr_4]\left[I_{N/4} \otimes \begin{bmatrix} U_2 & 0 \\ 0 & I_2 \end{bmatrix}\right][I_{N/2} \otimes S_2] \\ & \left[I_{N/4} \otimes \begin{bmatrix} D_2 & 0 \\ 0 & I_2 \end{bmatrix}\right]\left[I_{N/4} \otimes \begin{bmatrix} I_2 & I_2 \\ I_2 & -I_2 \end{bmatrix}\right][I_{N/4} \otimes Pc_4] \end{aligned}$$

-continued $$\ldots \left[I_4 \otimes \begin{bmatrix} D_{N/8} & 0 \\ 0 & I_{N/8} \end{bmatrix}\right]\left[I_4 \otimes \begin{bmatrix} I_{N/8} & I_{N/8} \\ I_{N/8} & -I_{N/8} \end{bmatrix}\right][I_4 \otimes Pc_{N/4}]$$

$$\left[I_2 \otimes \begin{bmatrix} D_{N/4} & 0 \\ 0 & I_{N/4} \end{bmatrix}\right]\left[I_4 \otimes \begin{bmatrix} I_{N/4} & I_{N/4} \\ I_{N/4} & -I_{N/4} \end{bmatrix}\right][I_2 \otimes Pc_{N/2}]$$

$$\begin{bmatrix} D_{N/2} & 0 \\ 0 & I_{N/2} \end{bmatrix}\begin{bmatrix} I_{N/2} & I_{N/2} \\ I_{N/2} & -I_{N/2} \end{bmatrix}[Pc]_N,$$

also, 4×4 kernel $\bar{s}_4$ form, we have (45)

$$[S]_N = \sqrt{\frac{2}{N}} [S]_N$$

$$= \sqrt{\frac{2}{N}} [Pr]_N \begin{bmatrix} U_{N/2} & 0 \\ 0 & I_{N/2} \end{bmatrix}\left[I_2 \otimes \left[\ldots \left[I_2 \otimes \underbrace{[Pr]_4 \begin{bmatrix} U_2 & 0 \\ 0 & I_2 \end{bmatrix}[I_2 \otimes S_2]\begin{bmatrix} D_2 & 0 \\ 0 & I_2 \end{bmatrix}\begin{bmatrix} I_2 & I_2 \\ I_2 & -I_2 \end{bmatrix}[Pc]_4}_{s_4}\right] \ldots\right]\right]$$
$$\underbrace{\phantom{XXXXXXXXXXXXXXXXXXXXXXXXXXXXXXXXXXXXXXXXXXXXXXXXXXXXXX}}_{s_{N/2}}$$

$$= \begin{bmatrix} D_{N/2} & 0 \\ 0 & I_{N/2} \end{bmatrix}\begin{bmatrix} I_{N/2} & I_{N/2} \\ I_{N/2} & -I_{N/2} \end{bmatrix}[Pc]_N.$$

Figure 2A:
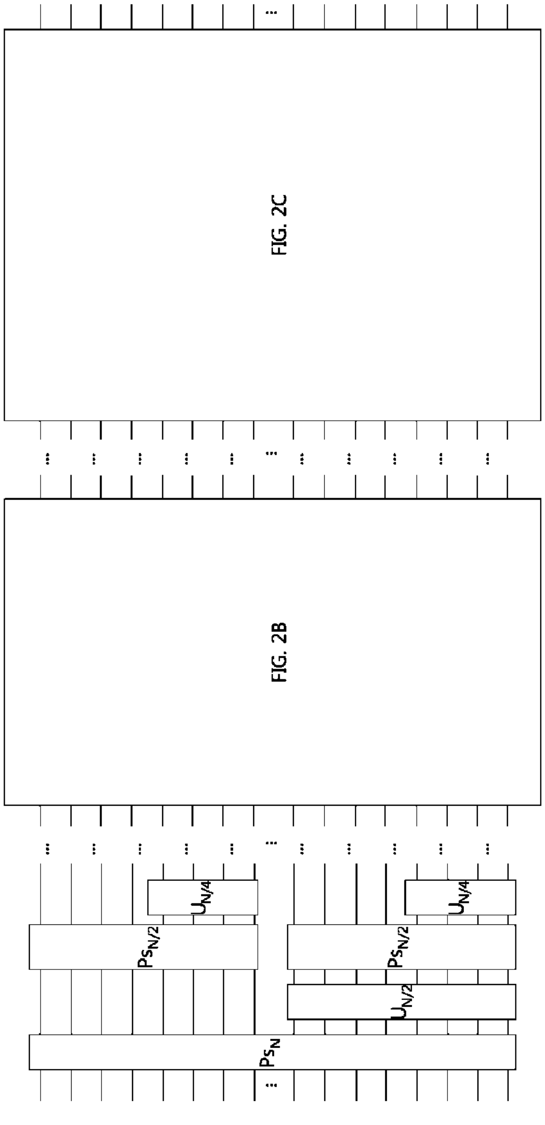
FIG. 2A-2C is a butterfly data flow graph of Equation (45) according to an exemplary embodiment of the present invention.
Figure 2B:
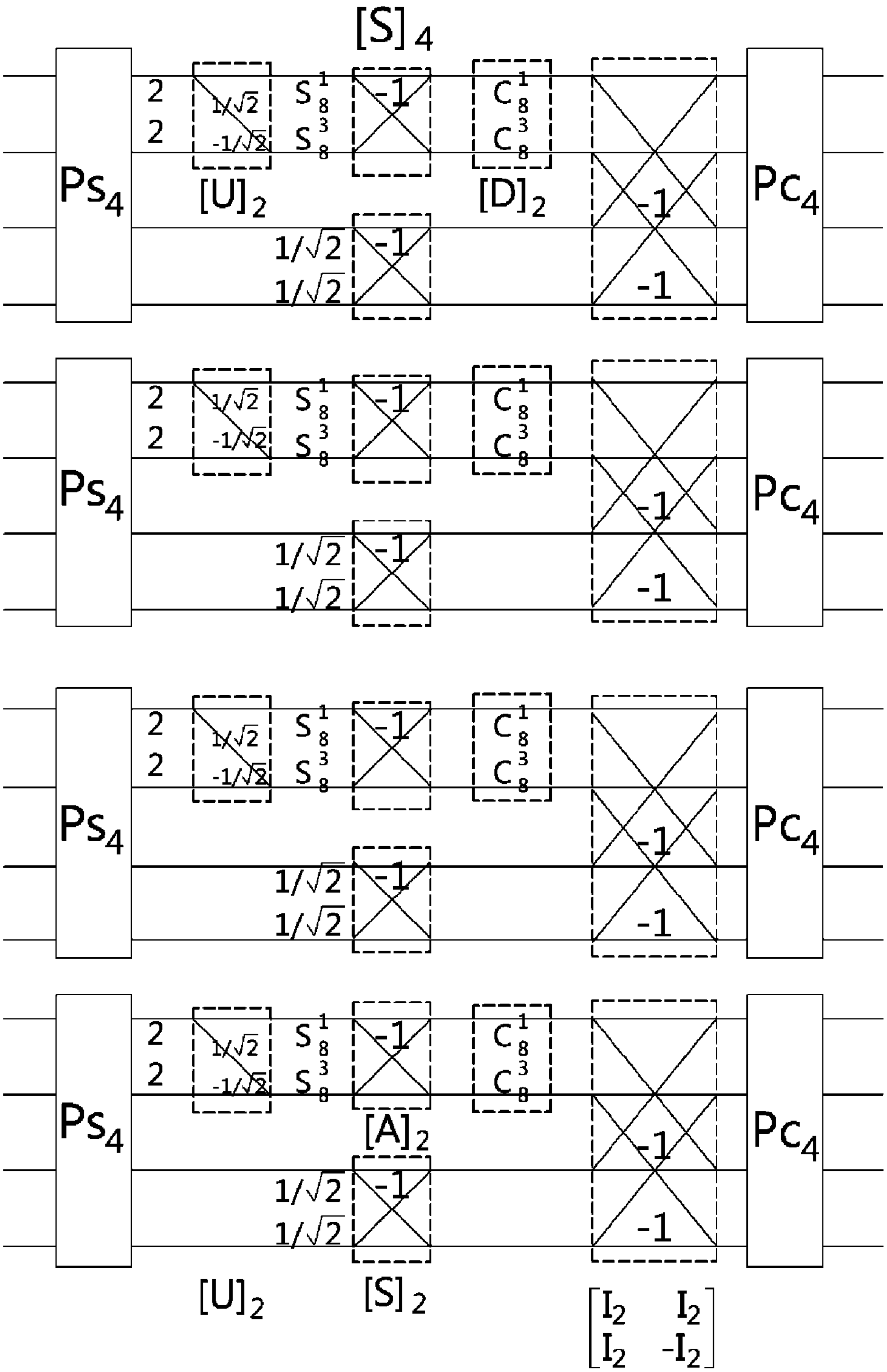
Figure 2C:
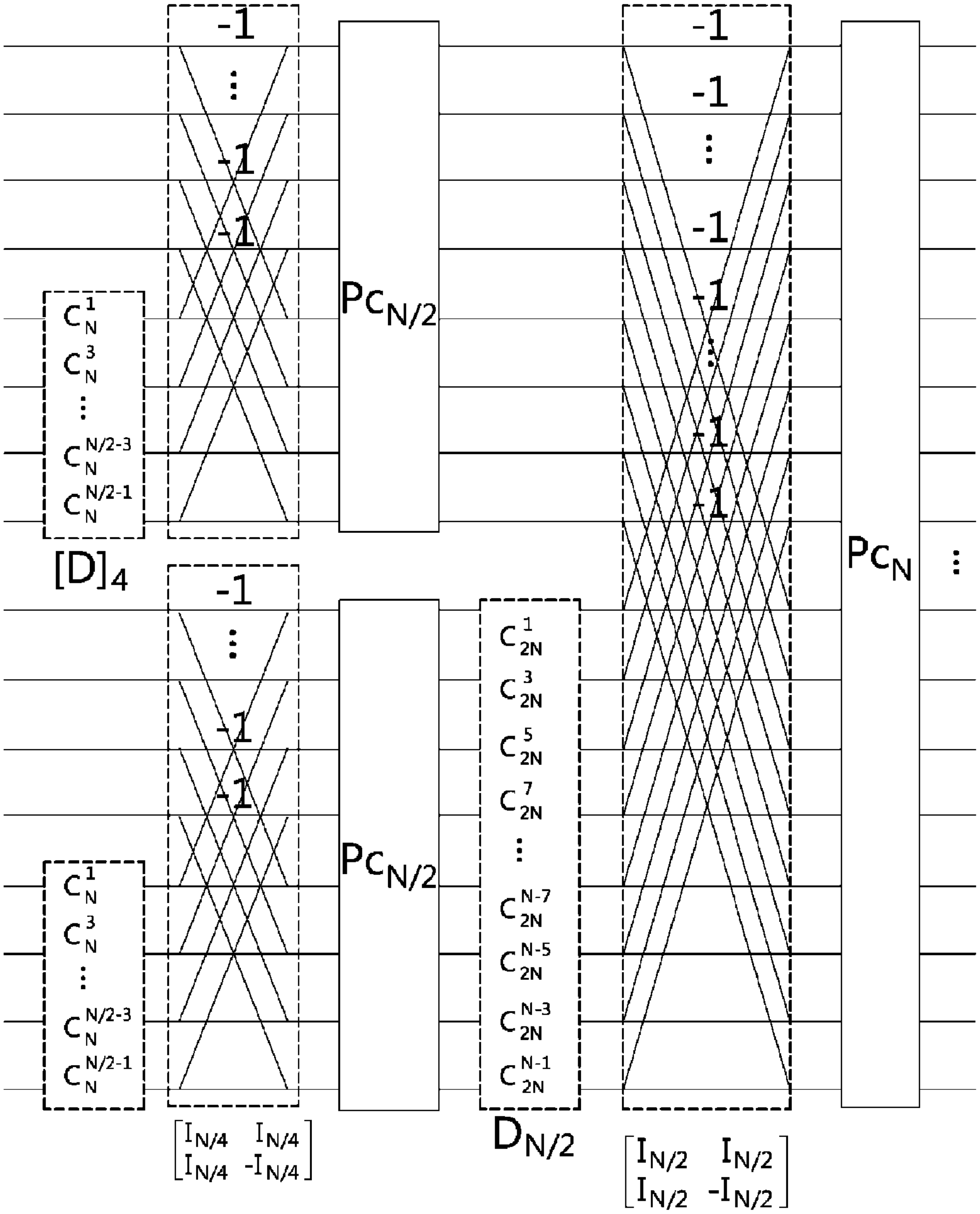

FIG. 2A-2C is a butterfly data flow graph of Equation (45) according to an exemplary embodiment of the present invention. As shown in FIG. 2A-2C, the data flow of Equation (45) is expressed.

IV. Element-Wise Inverse Sparse Matrix Decomposition for DFT Transform

The DFT is a Fourier representation of a given sequence $x(m)$, $$X(n) = \sum_{m=0}^{N-1} x(m) W^{nm}, \quad (46)$$

$$0 \leq n \leq N-1,$$

where $W = e^{j\frac{2\pi}{N}}$.

The N-point DFT matrix can be denoted by $[F]_N = [W^{nm}]_N$, $n,m = \{0, 1, 2, \ldots, N-1\}$, and the N×N Sylvester Hadamard matrix as $[H]_N$, respectively. The Sylvester Hadamard matrix is generated recursively by using the successive Kronecker products, $$[H]_N = [H]_2 \otimes [H]_{N/2} \quad (47)$$

for $N=4, 8, 16, \ldots$ and $$[H]_2 = \begin{bmatrix} 1 & 1 \\ 1 & -1 \end{bmatrix}.$$

For the remainder of this section, analysis will be concerned only with $N=2k$, $k=1, 2, 3, \ldots$ as the dimensionality of 2×2 Fourier matrices, $$[F]_2 = \frac{1}{\sqrt{2}}\begin{bmatrix} 1 & 1 \\ 1 & e^{j\pi} \end{bmatrix} = \frac{1}{\sqrt{2}}\begin{bmatrix} 1 & 1 \\ 1 & -1 \end{bmatrix}. \quad (48)$$

As an example for N=4, the DFT matrix $[F]_4$ can be represented as $$[F]_4 = \begin{bmatrix} W^0 & W^0 & W^0 & W^0 \\ W^0 & W^1 & W^2 & W^3 \\ W^0 & W^2 & W^4 & W^6 \\ W^0 & W^3 & W^6 & W^9 \end{bmatrix} \quad (49)$$

-continued $$= \begin{bmatrix} 1 & 1 & 1 & 1 \\ 1 & e^{-j\frac{\pi}{2}} & e^{-j\frac{\pi}{2}\times 2} & e^{-j\frac{\pi}{2}\times 3} \\ 1 & e^{-j\frac{\pi}{2}\times 2} & e^{-j\frac{\pi}{2}\times 4} & e^{-j\frac{\pi}{2}\times 6} \\ 1 & e^{-j\frac{\pi}{2}\times 3} & e^{-j\frac{\pi}{2}\times 6} & e^{-j\frac{\pi}{2}\times 9} \end{bmatrix}$$

$$= \begin{bmatrix} 1 & 1 & 1 & 1 \\ 1 & -j & -1 & j \\ 1 & -1 & 1 & -1 \\ 1 & j & -1 & -j \end{bmatrix}.$$

Similar to the DCT case, we can rewrite (49) by using permutations as $$[\tilde{F}]_4 = [Pr]_4[F_4] \quad (50)$$

$$= \begin{bmatrix} 1 & 0 & 0 & 0 \\ 0 & 0 & 1 & 0 \\ 0 & 1 & 0 & 0 \\ 0 & 0 & 0 & 1 \end{bmatrix}\begin{bmatrix} W^0 & W^0 & W^0 & W^0 \\ W^0 & W^1 & W^2 & W^3 \\ W^0 & W^2 & W^4 & W^6 \\ W^0 & W^3 & W^6 & W^9 \end{bmatrix}$$

$$= \begin{bmatrix} 1 & 0 & 0 & 0 \\ 0 & 0 & 1 & 0 \\ 0 & 1 & 0 & 0 \\ 0 & 0 & 0 & 1 \end{bmatrix}\begin{bmatrix} 1 & 1 & 1 & 1 \\ 1 & -j & -1 & j \\ 1 & -1 & 1 & -1 \\ 1 & j & -1 & -j \end{bmatrix}$$

$$= \begin{bmatrix} 1 & 1 & 1 & 1 \\ 1 & -1 & 1 & -1 \\ 1 & -j & -1 & j \\ 1 & j & -1 & -j \end{bmatrix}$$

$$= \begin{bmatrix} F_2 & F_2 \\ E_2 & -E_2 \end{bmatrix}$$

$$= \left(\begin{bmatrix} I_2 & I_2 \\ I_2 & -I_2 \end{bmatrix}\begin{bmatrix} F_2 & 0 \\ 0 & E_2 \end{bmatrix}\right)^T,$$

-continued $$\text{where } [E]_2 = \begin{bmatrix} 1 & -j \\ 1 & j \end{bmatrix},$$

its inverse matrix is from element-wise inverse, such that $$[E]_2^{-1} = \begin{bmatrix} 1 & 1 \\ j & -j \end{bmatrix} = \left(\begin{bmatrix} 1/1 & -1/j \\ 1/1 & 1/j \end{bmatrix}\right)^T. \quad (51)$$

We can write that sparse matrix decompose similar fashion of Eq. (6) & Eq. (31), $$\begin{aligned} [\tilde{F}]_N &= [Pr]_N[F]_N \\ &= \begin{bmatrix} \tilde{F}_{N/2} & \tilde{F}_{N/2} \\ E_{N/2} & -E_{N/2} \end{bmatrix} \\ &= \left(\begin{bmatrix} I_{N/2} & I_{N/2} \\ I_{N/2} & -I_{N/2} \end{bmatrix}\begin{bmatrix} \tilde{F}_{N/2} & 0 \\ 0 & E_{N/2} \end{bmatrix}\right)^T \end{aligned} \quad (52)$$

where $[F]_2=[\tilde{F}]_2$. The submatrix $E_N$ could be written by $$[E]_N=[Pr]_N[\tilde{F}]_N[W]_N. \quad (53)$$

Therefore, $$[W]_N = \begin{bmatrix} W^0 & 0 & \dots & 0 \\ 0 & W^1 & & 0 \\ \vdots & & \ddots & \vdots \\ 0 & \dots & 0 & W^{N-1} \end{bmatrix},$$

and W is the diagonal complex unit for 2N point DFT matrix.

For example, $$[E]_2 = \begin{bmatrix} 1 & -j \\ 1 & j \end{bmatrix}$$

can be calculated by using $$\begin{aligned} [E]_2 &= [Pr]_2[\tilde{F}]_2[W]_2 \\ &= \begin{bmatrix} 1 & 0 \\ 0 & 1 \end{bmatrix}\begin{bmatrix} 1 & 1 \\ 1 & -1 \end{bmatrix}\begin{bmatrix} W^0 & 0 \\ 0 & W^1 \end{bmatrix} \\ &= \begin{bmatrix} 1 & 1 \\ 1 & -1 \end{bmatrix}\begin{bmatrix} 1 & 0 \\ 0 & -j \end{bmatrix} \\ &= \begin{bmatrix} 1 & -j \\ 1 & j \end{bmatrix}. \end{aligned} \quad (54)$$

Thus, similar to Eq. (25), we write the DFT matrix as $$\begin{aligned} [\tilde{F}]_N &= [Pr]_N[F]_N \\ &= \left(\begin{bmatrix} I_{N/2} & I_{N/2} \\ I_{N/2} & -I_{N/2} \end{bmatrix}\begin{bmatrix} \tilde{F}_{N/2} & 0 \\ 0 & E_{N/2} \end{bmatrix}\right)^T \\ &= \begin{bmatrix} \tilde{F}_{N/2} & 0 \\ 0 & E_{N/2} \end{bmatrix}\begin{bmatrix} I_{N/2} & I_{N/2} \\ I_{N/2} & -I_{N/2} \end{bmatrix} \\ &= \begin{bmatrix} \tilde{F}_{N/2} & 0 \\ 0 & Pr_{N/2}\tilde{F}_{N/2}W_{N/2} \end{bmatrix}\begin{bmatrix} I_{N/2} & I_{N/2} \\ I_{N/2} & -I_{N/2} \end{bmatrix} \\ &= \begin{bmatrix} I_{N/2} & 0 \\ 0 & Pr_{N/2} \end{bmatrix}\begin{bmatrix} \tilde{F}_{N/2} & 0 \\ 0 & \tilde{F}_{N/2} \end{bmatrix}\begin{bmatrix} I_{N/2} & 0 \\ 0 & W_{N/2} \end{bmatrix} \\ &\quad \begin{bmatrix} I_{N/2} & I_{N/2} \\ I_{N/2} & -I_{N/2} \end{bmatrix}. \end{aligned} \quad (55)$$

Finally, based on the recursive 4×4 kernel $\overline{F}_4$ form, we have $$\begin{aligned} [F]_N &= ([Pr]_N)^{-1}[\tilde{F}]_N \\ &= ([Pr]_N)^{-1}\begin{bmatrix} I_{N/2} & 0 \\ 0 & Pr_{N/2} \end{bmatrix}\begin{bmatrix} \tilde{F}_{N/2} & 0 \\ 0 & \tilde{F}_{N/2} \end{bmatrix}\begin{bmatrix} I_{N/2} & 0 \\ 0 & W_{N/2} \end{bmatrix}\begin{bmatrix} I_{N/2} & I_{N/2} \\ I_{N/2} & -I_{N/2} \end{bmatrix} \\ &= [Pr]_N\begin{bmatrix} I_{N/2} & 0 \\ 0 & Pr_{N/2} \end{bmatrix}[I_2 \otimes Pr_{N/2}]\left[I_2 \otimes \begin{bmatrix} I_{N/4} & 0 \\ 0 & Pr_{N/4} \end{bmatrix}\right] \dots [I_{N/4} \otimes Pr_4]\left[I_{N/4} \otimes \begin{bmatrix} I_2 & 0 \\ 0 & Pr_2 \end{bmatrix}\right] \\ &\quad [I_{N/2} \otimes F_2]\left[I_{N/4} \otimes \begin{bmatrix} I_2 & 0 \\ 0 & W_2 \end{bmatrix}\right]\left[I_{N/4} \otimes \begin{bmatrix} I_2 & I_2 \\ I_2 & -I_2 \end{bmatrix}\right] \dots \left[I_2 \otimes \begin{bmatrix} I_{N/4} & 0 \\ 0 & W_{N/4} \end{bmatrix}\right] \\ &\quad \left[I_2 \otimes \begin{bmatrix} I_{N/4} & I_{N/4} \\ I_{N/4} & -I_{N/4} \end{bmatrix}\right]\begin{bmatrix} I_{N/2} & 0 \\ 0 & W_{N/2} \end{bmatrix}\begin{bmatrix} I_{N/2} & I_{N/2} \\ I_{N/2} & -I_{N/2} \end{bmatrix} \\ &= [Pr]_N^{-1}\begin{bmatrix} I_{N/2} & 0 \\ 0 & Pr_{N/2} \end{bmatrix} \\ &\quad \left[I_2 \otimes \underbrace{\left[\dots \underbrace{[Pr]_4^{-1}\begin{bmatrix} I_2 & 0 \\ 0 & Pr_2 \end{bmatrix}[I_2 \otimes \tilde{F}_2]\begin{bmatrix} I_2 & 0 \\ 0 & W_2 \end{bmatrix}\begin{bmatrix} I_2 & I_2 \\ I_2 & -I_2 \end{bmatrix}}_{F_4} \dots\right]}_{F_{N/2}}\right] \\ &\quad \begin{bmatrix} I_{N/2} & 0 \\ 0 & W_{N/2} \end{bmatrix}\begin{bmatrix} I_{N/2} & I_{N/2} \\ I_{N/2} & -I_{N/2} \end{bmatrix}. \end{aligned} \quad (56)$$

It is clear that the form of Eq. (56) is the same as that of Eq. (27), where we only need change $K_l$ to $Pr_l$ and $D_l$ to $W_l$, with $l \in \{2, 4, 8, \ldots, N/2\}$. Consequently, the butterfly data flow of the DFT matrix could be drawn as FIG. 3A-3C.

Figure 3A:
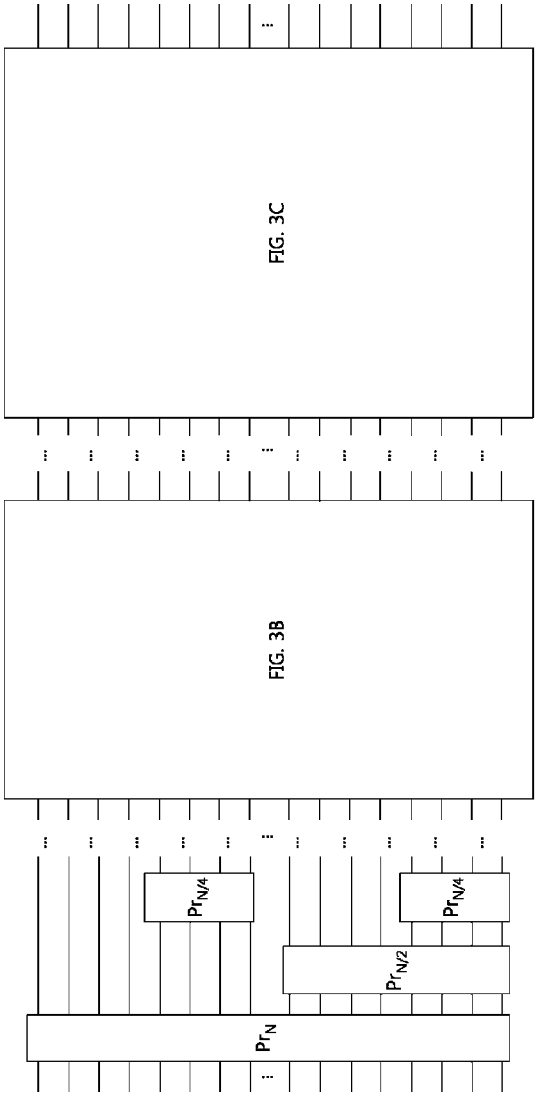
FIG. 3A-3C is a butterfly data flow graph of Equation (56) according to an exemplary embodiment of the present invention.
Figure 3B:
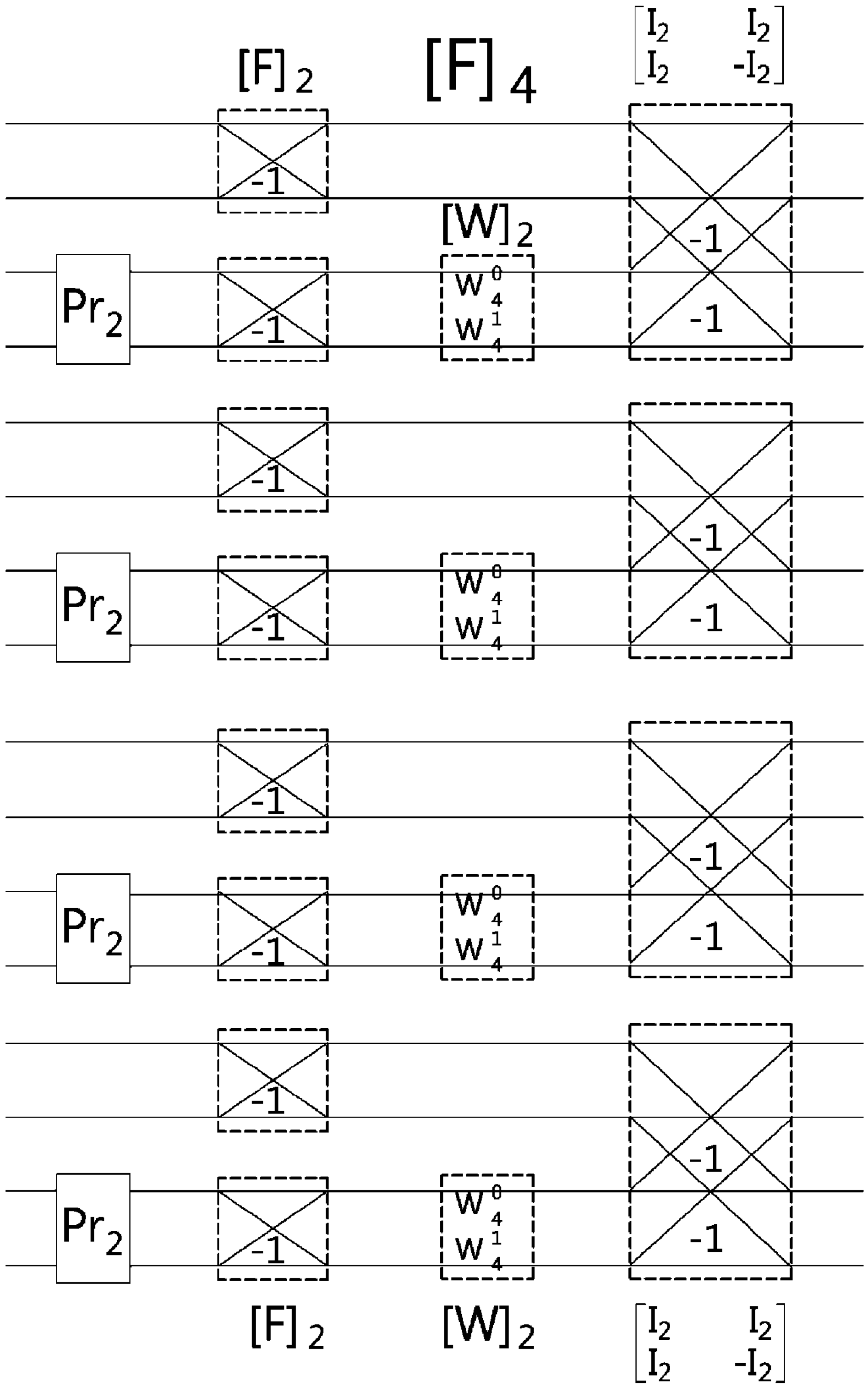
Figure 3C:
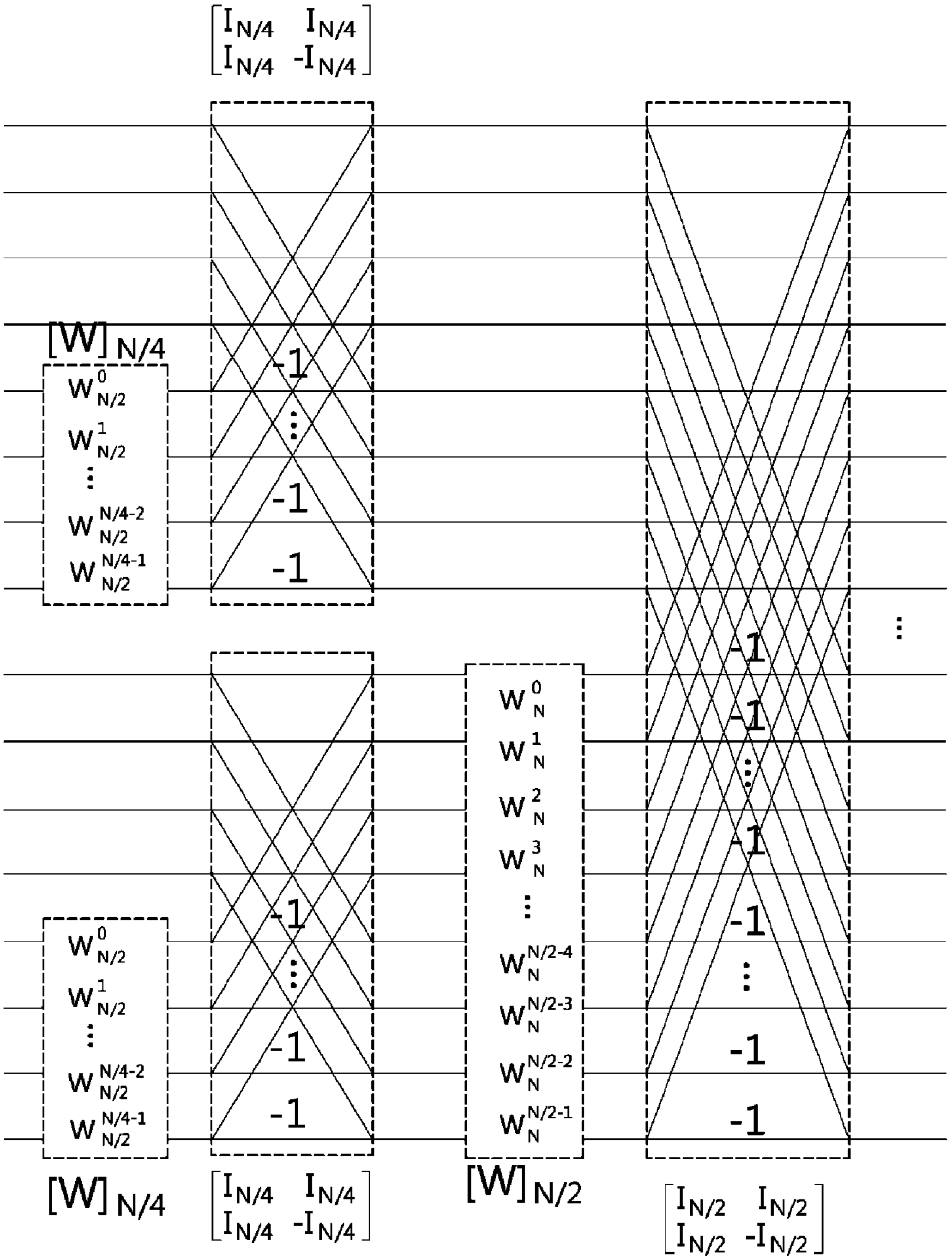

FIG. 3A-3C is a butterfly data flow graph of Equation (56) according to an exemplary embodiment of the present invention. The data flow of Equation (56) is expressed as shown in FIG. 3A-3C.

V. Element-Wise Inverse Sparse Matrix Decomposition for HWT Transform

The discrete wavelet transform based on the Haar matrix (HWT), from N components of the signal to N wavelet coefficients, is expressed by a N×N matrix S. Here come the two directions: Synthesis in discrete time: x=Sb, Analysis in discrete time: y=Hx, where $H=S^{-1}=S^T$. As we know $$[H]_2 = \begin{bmatrix} r & r \\ r & -r \end{bmatrix} = [S]_2$$

and the scaled coefficient: $r=1\sqrt{2}$. Its inverse matrix is from element-wise inverse, such that $$[H]_2 = \begin{bmatrix} r & r \\ r & -r \end{bmatrix} = \frac{1}{\sqrt{2}}\begin{bmatrix} 1 & 1 \\ 1 & -1 \end{bmatrix} \tag{57}$$

and $$[H]_2^{-1} = \frac{1}{2}\begin{bmatrix} 1/r & 1/r \\ 1/r & -1/r \end{bmatrix}^T.$$

Similar fashion as Eqs. (6, 31, 50), then we have $$\begin{aligned} [\bar{H}]_2 &= [Pi]_2[H]_2[Pj]_2 \\ &= \begin{bmatrix} 1 & 0 \\ 0 & 1 \end{bmatrix}\begin{bmatrix} r & r \\ r & -r \end{bmatrix}\begin{bmatrix} 1 & 0 \\ 0 & -1 \end{bmatrix} \\ &= \begin{bmatrix} r & -r \\ r & r \end{bmatrix}. \end{aligned} \tag{58}$$

Where $$[Pi]_N = \begin{bmatrix} 0 & I_{N/2} \\ I_{N/2} & 0 \end{bmatrix}, \quad [Pj]_N = [Pr]_N\begin{bmatrix} I_{N/2} & 0 \\ 0 & -I_{N/2} \end{bmatrix}. \tag{59}$$

Moreover, set $$\begin{aligned} [Pa]_N &= [Pi]_N^{-1} \\ &= [Pi]_N, \\ [Pb]_N &= r[Pj]_N^{-1} \\ &= r\begin{bmatrix} I_{N/2} & 0 \\ 0 & -I_{N/2} \end{bmatrix}[Pr]_N. \end{aligned} \tag{60}$$

We can write a permuted 4×4 HWT matrix $$\begin{aligned} [\bar{H}]_4 &= [Pi]_4[H]_4[Pj]_4 \\ &= \begin{bmatrix} 0 & 0 & 1 & 0 \\ 0 & 0 & 0 & 1 \\ 1 & 0 & 0 & 0 \\ 0 & 1 & 0 & 0 \end{bmatrix}\begin{bmatrix} r^2 & r^2 & r^2 & r^2 \\ r^2 & r^2 & -r^2 & -r^2 \\ r & -r & 0 & 0 \\ 0 & 0 & r & -r \end{bmatrix}\begin{bmatrix} 1 & 0 & 0 & 0 \\ 0 & 0 & -1 & 0 \\ 0 & 1 & 0 & 0 \\ 0 & 0 & 0 & -1 \end{bmatrix} \\ &= r\begin{bmatrix} I_2 & I_2 \\ H_2 & -H_2 \end{bmatrix} \\ &= r\begin{bmatrix} I_2 & 0 \\ 0 & H_2 \end{bmatrix}\begin{bmatrix} I_2 & I_2 \\ I_2 & -I_2 \end{bmatrix} \\ &= r\begin{bmatrix} I_2 & 0 \\ 0 & Pi_2^{-1}\bar{H}_2 Pj_2^{-1} \end{bmatrix}\begin{bmatrix} I_2 & I_2 \\ I_2 & -I_2 \end{bmatrix} \\ &= \begin{bmatrix} I_2 & 0 \\ 0 & Pa_2 \end{bmatrix}\begin{bmatrix} I_2 & 0 \\ 0 & \bar{H}_2 \end{bmatrix}\begin{bmatrix} rI_2 & 0 \\ 0 & Pb_2 \end{bmatrix}\begin{bmatrix} I_2 & I_2 \\ I_2 & -I_2 \end{bmatrix}. \end{aligned} \tag{61}$$

For the 8-point HWT, the permuted 8×8 HWT is $$\begin{aligned} [\bar{H}]_8 &= [Pi]_8[H]_8[Pj]_8 \\ &= r\begin{bmatrix} I_4 & 0 \\ 0 & H_4 \end{bmatrix}\begin{bmatrix} I_4 & I_4 \\ I_4 & -I_4 \end{bmatrix} \\ &= r\begin{bmatrix} I_4 & 0 \\ 0 & Pi_4^{-1}\bar{H}_4 Pj_4^{-1} \end{bmatrix}\begin{bmatrix} I_4 & I_4 \\ I_4 & -I_4 \end{bmatrix} \\ &= \begin{bmatrix} I_4 & 0 \\ 0 & Pa_4 \end{bmatrix}\begin{bmatrix} I_6 & 0 \\ 0 & Pa_2 \end{bmatrix}\begin{bmatrix} I_6 & 0 \\ 0 & \bar{H}_2 \end{bmatrix}\begin{bmatrix} I_4 & & 0 \\ & rI_2 & \\ 0 & & Pb_2 \end{bmatrix}\begin{bmatrix} rI_4 & 0 \\ 0 & Pb_4 \end{bmatrix} \\ &\quad \begin{bmatrix} I_4 & I_4 \\ I_4 & -I_4 \end{bmatrix}. \end{aligned} \tag{62}$$

We can write that $$\begin{aligned} [\bar{H}]_N &= [Pi]_N[H]_N[Pj]_N \\ &= r\begin{bmatrix} I_{N/2} & 0 \\ 0 & H_{N/2} \end{bmatrix}\begin{bmatrix} I_{N/2} & I_{N/2} \\ I_{N/2} & -I_{N/2} \end{bmatrix} \\ &= r\begin{bmatrix} I_{N/2} & 0 \\ 0 & Pi_{N/2}^{-1}\bar{H}_{N/2}Pj_{N/2}^{-1} \end{bmatrix}\begin{bmatrix} I_{N/2} & I_{N/2} \\ I_{N/2} & -I_{N/2} \end{bmatrix} \\ &= \begin{bmatrix} I_{N/2} & 0 \\ 0 & Pa_{N/2} \end{bmatrix}\begin{bmatrix} I_{N/2} & 0 \\ 0 & \bar{H}_{N/2} \end{bmatrix}\begin{bmatrix} rI_{N/2} & 0 \\ 0 & Pb_{N/2} \end{bmatrix}\begin{bmatrix} I_{N/2} & I_{N/2} \\ I_{N/2} & -I_{N/2} \end{bmatrix}. \end{aligned} \tag{63}$$

The Eq. (63) of general recursive form for the HWT matrix can be rewritten as $$\begin{aligned} [H]_N &= [Pi]_N^{-1}[\bar{H}]_N[Pj]_N^{-1} \\ &= \frac{1}{r}[Pa]_N\begin{bmatrix} I_{N/2} & 0 \\ 0 & Pa_{N/2} \end{bmatrix}\begin{bmatrix} I_{3N/4} & 0 \\ 0 & Pa_{N/4} \end{bmatrix} \cdots \begin{bmatrix} I_{N-2} & 0 \\ 0 & Pa_2 \end{bmatrix} \\ &\quad \begin{bmatrix} I_{N-2} & 0 \\ 0 & \bar{H}_{N/2} \end{bmatrix}\begin{bmatrix} I_{N-4} & & 0 \\ & rI_2 & \\ 0 & & Pb_2 \end{bmatrix} \end{aligned} \tag{64}$$

-continued $$\begin{bmatrix} I_{N-4} & 0 & \\ 0 & I_2 & I_2 \\ & I_2 & -I_2 \end{bmatrix} \cdots \begin{bmatrix} I_{N/2} & & 0 \\ & rI_{N/4} & \\ 0 & & Pb_{N/4} \end{bmatrix}$$

$$\begin{bmatrix} I_{N/2} & 0 & \\ 0 & I_{N/4} & I_{N/4} \\ & I_{N/4} & -I_{N/4} \end{bmatrix} \begin{bmatrix} rI_{N/2} & 0 \\ 0 & Pb_{N/2} \end{bmatrix} \begin{bmatrix} I_{N/2} & I_{N/2} \\ I_{N/2} & -I_{N/2} \end{bmatrix} [Pb]_N.$$

Corresponding to Eq. (64), we can draw the butterfly data flow graph in FIG. 4.

Figure 4:
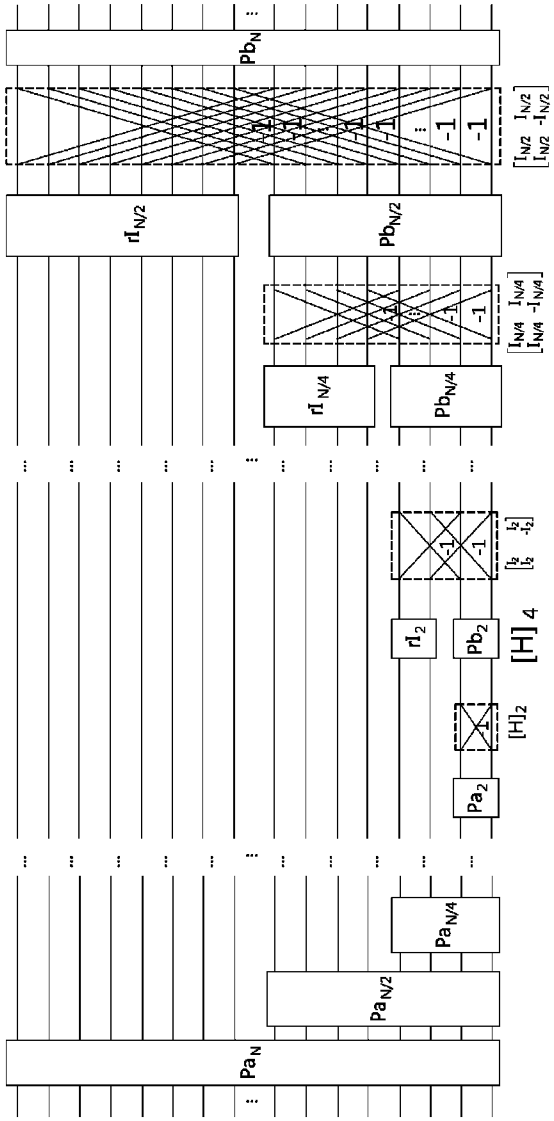
FIG. 4 is a butterfly data flow graph of Equation (64) according to an exemplary embodiment of the present invention.

FIG. 4 is a butterfly data flow graph of Equation (64) according to an exemplary embodiment of the present invention. The data flow of Equation (64) is represented as shown in FIG. 4.

VI. Signal Transformation Apparatus Applying Hybrid Architecture

We derive the recursive formulas for the DCT-II/DST-II/DFT and HWT. The results show that the DCT-II/DST-II/DFT and HWT matrices can be unified by using the same sparse matrix decomposition algorithm based on Jacket matrix, and recursive architecture with in some characters changed.

Clearly, the butterfly data flow graphs corresponding to the Eqs. (27), (45), (56) and (64) have the similar recursive flows. What's more, all of the four graphs have 2h($h=\log_2 N$) steps, and we can derive in FIGS. 2A~2C, FIGS. 3A~3C and FIG. 4 from in FIG. 1A~1C by the following steps.

Figure 6A:
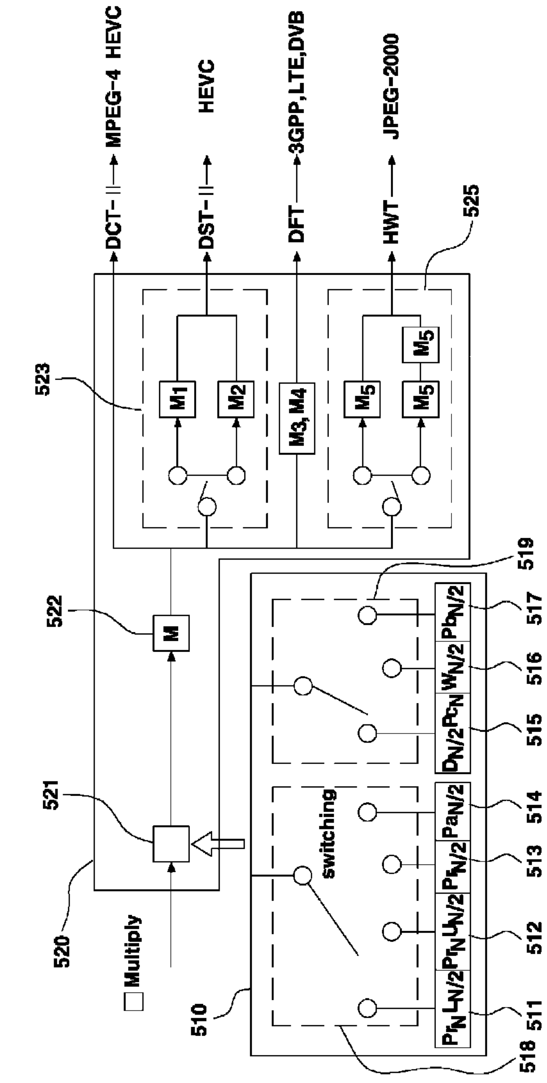
FIG. 6A to 6C is a detailed block diagram of the signal transformation apparatus according to an exemplary embodiment of the present invention.

To get the equation of Eq. (45) is the same as that of Eq. (27), we only need to change $[L]_n$ to $[U]_n$, with the parameters $n \in \{2, 4, 8, \ldots, N/2\}$, and multiply diagonal block-wise basis identity matrix as $[M_1]$ $[M_2]$ at the every step output DCT-II, and then we can get the DST-II matrix as we need. If we change from $[L]_n$ to $[Pr]_n$ and $[D]_n$ to $[W]_n$ and multiply the matrix $[M_3]$ during the first h steps, when the last h steps coming, multiply the $[M_4]$ matrix, then we can get the Eq. (56). For the Eq. (64), we can change the switching from $[L]_n$ to $[Pa]_n$ and $[D]_n$ to $[Pb]_n$, after input the data, multiply $[M_5]$ at the last h steps. These diagonal block matrices are given Eqs. (65-70) as shown in FIG. 6A, $$[M]_N = [I]_{N/2^{h+1}} \otimes \begin{bmatrix} I_{2^h} & I_{2^h} \\ I_{2^h} & -I_{2^h} \end{bmatrix}, \quad (65)$$

$$[M_1]_N = [I]_{N/2^{h+1}} \otimes ([I]_{2^h} \otimes [\bar{I}]_2), \quad (66)$$

where $$[\bar{I}]_2 = \begin{bmatrix} 0 & 1 \\ 1 & 0 \end{bmatrix}$$

$$[M_2]_N = [I]_{N/2^{h+1}} \otimes \left( \begin{bmatrix} 1 & 0 \\ 0 & -1 \end{bmatrix} \otimes [I]_{2^h} \right), \quad (67)$$

$$[M_3]_N = [I]_{2^{h-1}-1} \otimes \left( [I]_{N/2^h} \oplus [Pa]^{-1}_{N/2^h} \right) \oplus [I]_{N/2^{h-1}}, \quad (68)$$

$$[M_4]_N = [I]_{N-2^{h+1}} \oplus r[I]_{2^h} \oplus [I]_{2^h}, \quad (69)$$

$$[M_5]_N = [I]_{N/2^{h+1}-1} \otimes \begin{bmatrix} I_{2^h} & -I_{2^h} \\ I_{2^h} & I_{2^h} \end{bmatrix} \oplus [I]_{2^{h+1}}, \quad (70)$$

where ⊗ is the Kronecker and ⊕ is the direct sum. For example, we calculate the dimension of Eq. (68)

$$(2^{h-1}-1)\times(N/2^h+N/2^h)+N/2^{h-1}=(2^{h-1}-1)\times N/2^{h-1}+N/2^{h-1}=N-N/2^{h-1}+N/2^{h-1}=N.$$

As an illustrated in FIG. 1A~1C, FIG. 2A~2C, FIG. 3A~3C and FIG. 4 we find that the DST-II computation can be from the computation of DCT-II by replacing the submatrix $[L]_N$ to $[U]_N$. As to the DFT, it computation can be from the computation of the DCT-II matrix by replacing the submatrix $[D]_N$ to $[W]_N$, and the permutation matrix $[L]_N$ to $[Pr]_N$ as to the HWT, we not only need to replace submatrix $[D]_N$ by $[Pb]_N$, and the permutation matrix $[L]_N$ by $[Pa]_N$, but also multiply some special matrices at the output of HWT. As a result, a simple generalized block diagram for the DCT-II/DST-II/DFT/HWT hybrid fast algorithms can be shown in FIG. 6A.

Figure 6B:
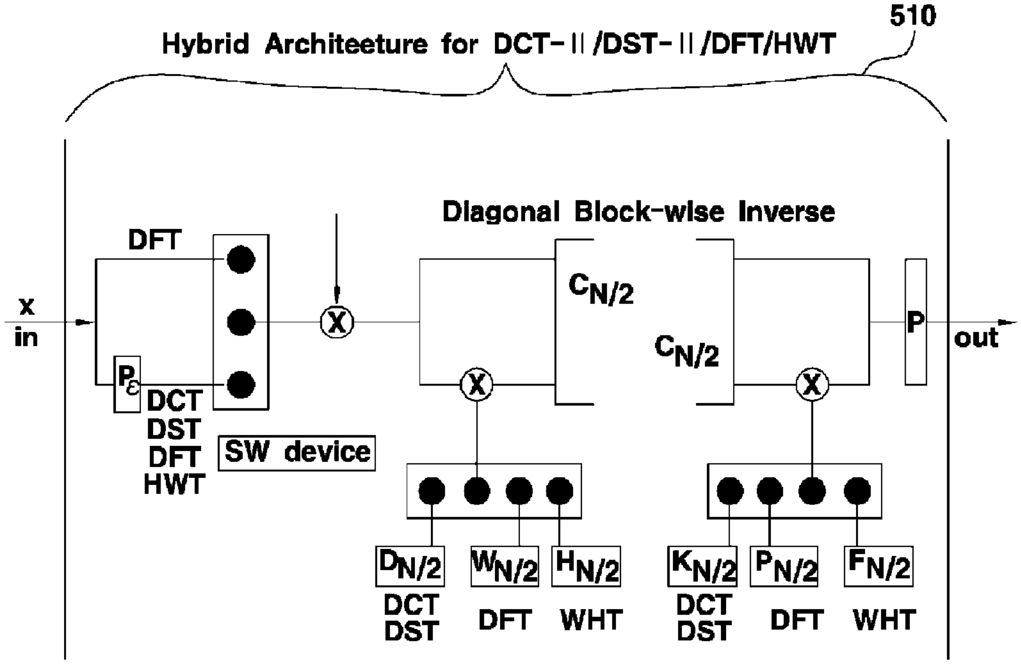
Figure 6C:
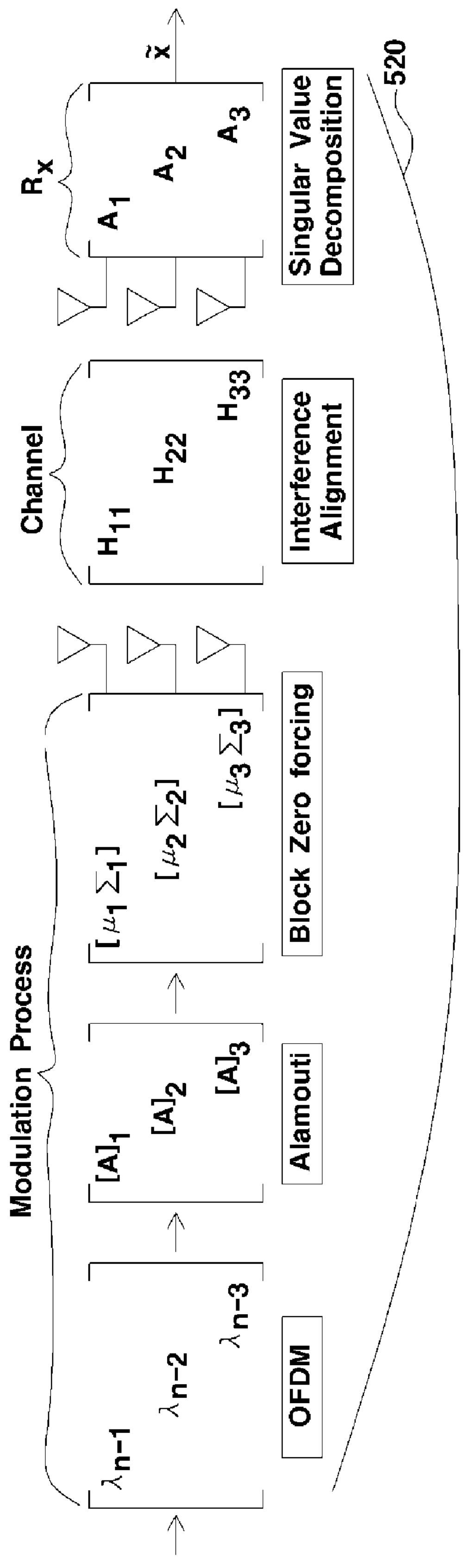

FIGS. 6B and 6C shows variance comparison of the KLT/DCT/DST/DFT/Haar. The overall scheme switches between the directions as horizontal, vertical or bounding in intra mode depending on the prediction. The compare of computational complexity of conventional independent the DCT-II, DST-II, DFT, Haar transform and hybrid DCT-II/DST-II/DFT/HW are shown in Table I & II. The computational complexity of the proposed hybrid algorithms are slower than the conventional ones, due to the hybrid architecture algorithm.

Figure 6D:
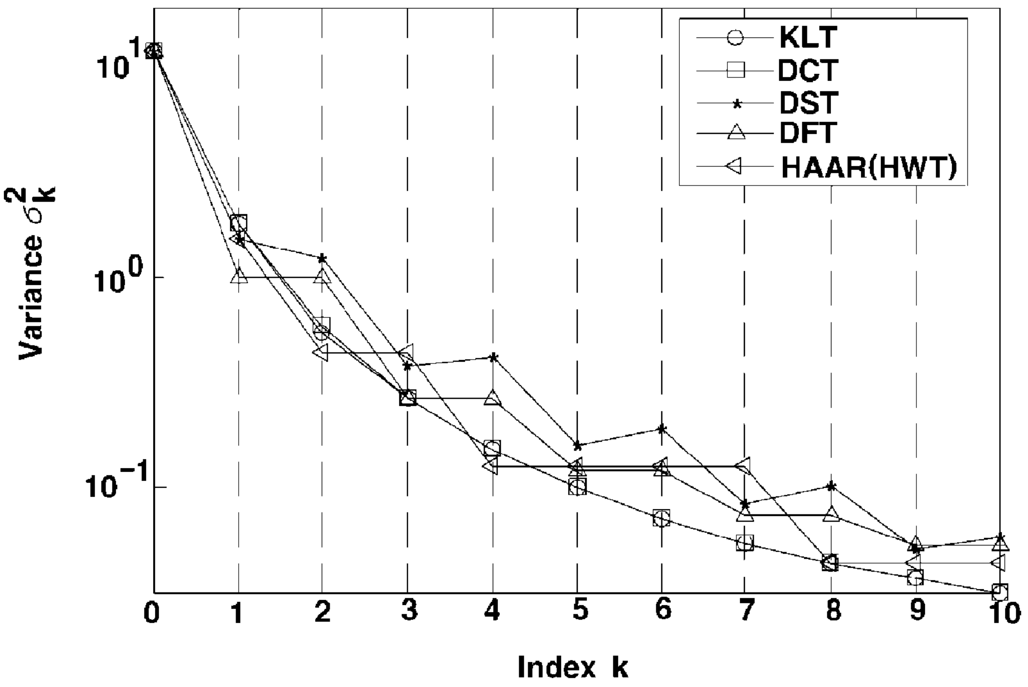
FIG. 6D is a graph of variance comparison of the KLT/DCT/DST/DFT/HWT

But the proposed hybrid algorithms are much more easily to extend because of the diagonal block-wise inverse operation. Moreover, it is really extensible to larger transform sizes based on 4×4 kernel such as □$_4$, $S_4$, $\tilde{F}_4$ and $\tilde{H}_4$. These diagonal block-wise are well suitable to without ISI OFDM, diagonal block zero forcing singular value decomposition (SVD) for multiuser MIMO and subspace diagonal channel interference alignment as shown in FIG. 6D.

Figure 5:
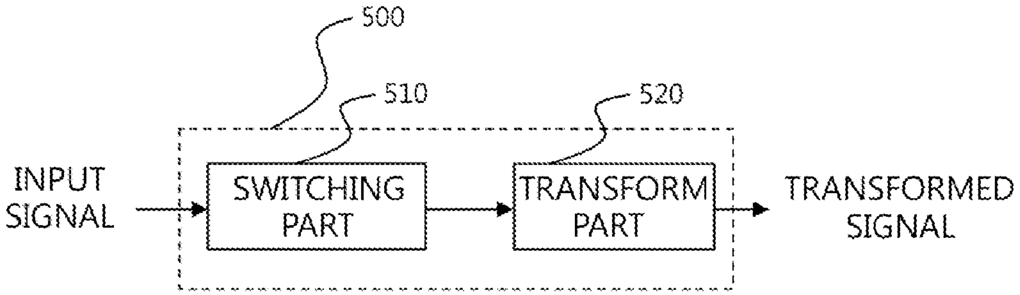
FIG. 5 is a block diagram of a signal transformation apparatus adopting a hybrid architecture according to an exemplary embodiment of the present invention.

As a result, the signal transformation apparatus applying the hybrid architecture of FIGS. 5, 6A, and 6B can be provided, which is explained now.

FIG. 5 is a block diagram of a signal transformation apparatus 500 adopting the hybrid architecture according to an exemplary embodiment of the present invention. FIGS. 6A and 6B are a detailed block diagram of the signal transformation apparatus 500 according to an exemplary embodiment of the present invention. The signal transformation apparatus 500 of FIG. 5 adopts the hybrid architecture for the DCT-II, the DST-II, the DFT, and the HWT.

In detail, the signal transformation apparatus 500 includes a switching part 510 and a transformation part 520. The switching part 510 selects one of the DCT-II, the DST-II, the DFT, and the HWT. The transformation part 520 transforms and outputs the input signal using the transform selected by the switching part 510.

As shown in FIG. 6A, the switching part 510 includes a submatrix selector 518 and a permutation matrix selector 519. The transformation part 520 includes a first multiply 521, a second multiply 522, a third multiply 523, a fourth multiply, and a fifth multiply 525.

In detail, the submatrix selector 518 selects the submatrix computation for any one of the DCT-II, the DST-II, the DFT, and the HWT. The permutation matrix selector 519 selects the permutation matrix computation for any one of the DCT-II, the DST-II, the DFT, and the HWT.

First, when the DCT-II transform is selected by the switching part 510, the submatrix selector 518 selects $[L]_N$ 511 as the submatrix and the permutation matrix selector 519 selects $[D]_N$ 515 as the permutation matrix.

The transformation part 520 computes Equation (18) using the submatrix $[L]_N$ and the permutation matrix $[D]_N$ and thus applies the DCT-II to the input signal. More specifically, the first multiply 521 of the transformation part 520 multiplies the input signal by the submatrix $[L]_N$ and the permutation matrix $[D]_N$. Next, the second multiply 522 of the transformation part 520 multiplies the result by the matrix M. The transformation part 520 can transform the input signal using the DCT-II for the MPEG-4 HEVC.

Secondly, when the switching part 510 selects the DST-II transform, the submatrix selector 518 selects $[U]_N$ 512 as the submatrix and the permutation matrix selector 519 selects $[D]_N$ 515 as the permutation matrix.

The transformation part 520 computes Equation (34) by using the submatrix $[U]_N$ and the permutation matrix $[D]_N$ and multiplying the matrix $[M_1]$ $[M_2]$ in each output, and thus applies the DST-II to the input signal. More specifically, the first multiply 521 of the transformation part 520 multiplies the input signal by the submatrix $[U]_N$ and the permutation matrix $[D]_N$. Next, the second multiply 522 of the transformation part 520 multiplies the product by the matrix M. The third multiply 523 multiplies the matrix $[M_1]$ $[M_2]$ in each output of the previous product. Next, the transformation part 520 can generate the HEVC signal by applying the DST-II to the input signal.

Thirdly, when the switching part 510 selects the DFT transform, the submatrix selector 518 selects $[Pr]_N$ 513 as the submatrix and the permutation matrix selector 519 selects $[W]_n$ 516 as the permutation matrix.

The transformation part 520 computes Equation (45) by using the submatrix $[Pr]_N$ and the permutation matrix $[W]_n$, multiplying the input signal by the matrix $[M_3]$ during the first h steps of the 2h steps, and multiplying the matrix $[M_4]$ during the last h steps, and thus DFT-transforms the input signal. In more detail, the first multiply 521 of the transformation part 520 multiplies the input signal by the submatrix $[Pr]_N$ and the permutation matrix $[W]_n$. Next, the second multiply 522 of the transformation part 520 multiplies the product by the matrix M. The fourth multiply 524 multiplies the input signal by the matrix $[M_3]$ during the first h steps of the 2h steps and multiplies the matrix $[M_4]$ during the last h steps. Thus, the transformation part 520 can transform the input signal to the 3GPP, LTE, and DVB signal through the DFT.

Fourthly, when the switching part 510 selects the HWT transform, the submatrix selector 518 selects $[Pa]_N$ 514 as the submatrix and the permutation matrix selector 519 selects $[Pb]_N$ 517 as the permutation matrix.

The transformation part 520 computes Equation (53) by using the submatrix $[Pa]_N$ and the permutation matrix $[Pb]_N$ and multiplying the input signal by the matrix $[M_5]$ during the last h steps of the 2h steps, and thus HWT-transforms the input signal. In more detail, the first multiply 521 of the transformation part 520 multiplies the input signal by the submatrix $[Pa]_N$ and the permutation matrix $[Pb]_N$. Next, the second multiply 522 of the transformation part 520 multiplies the product by the matrix M. The fifth multiply 525 multiplies the input signal by the matrix $[M_5]$ during the last h steps of the 2h steps. Thus, the transformation part 520 can transform the input signal to the JPEG-2000 signal through the HWT.

As such, the signal transformation apparatus 500 can selectively perform any one of the DCT-II, the DST-II, the DFT and the HWT by applying the hybrid architecture. Also, the signal transformation apparatus 500 can attain the hybrid architecture of low complexity by jointly applying the recursive structure of the DCT-II, the DST-II, the DFT, and the HWT. The present hybrid architecture exhibits the lower computational complexity than the direct scheme as shown in the following table.

| | Conventional methods | | Proposed | |
|---|---|---|---|---|
| | Addition | Multiplication | Addition | Multiplication |
| DCT-II | Chen et al. | | $N(3\log_2 N + N - 1)/4$ | $(N^2/32 + 2N)\log_2 N - N^2/16 - N/2$ |
| | $3/2N(\log_2 N - 1) + 2$ | $N\log_2 N - 3/2N + 4$ | | |
| DST-II | Z. Wang | | $N(3\log_2 N + N - 1)/4$ | $(N^2/32 + 2N)\log_2 N - N^2/16 - N/2$ |
| | $3/2N(\log_2 N - 1) + 2$ | $N\log_2 N - 3/2N + 4$ | | |
| DFT | Cooley & Tukey | | $N\log_2 N$ | $N(\log_2 N - 1/2)$ |
| | $N\log_2 N$ | $1/2N(\log_2 N)$ | | |
| HWT | Andrews & Caspari | | $\log_2 N(2 + N/2) - N/2$ | $(3 + 3N/4)\log_2 N + 1 + N$ |
| | $2(N - 1)$ | N | | |

Figure 7A:
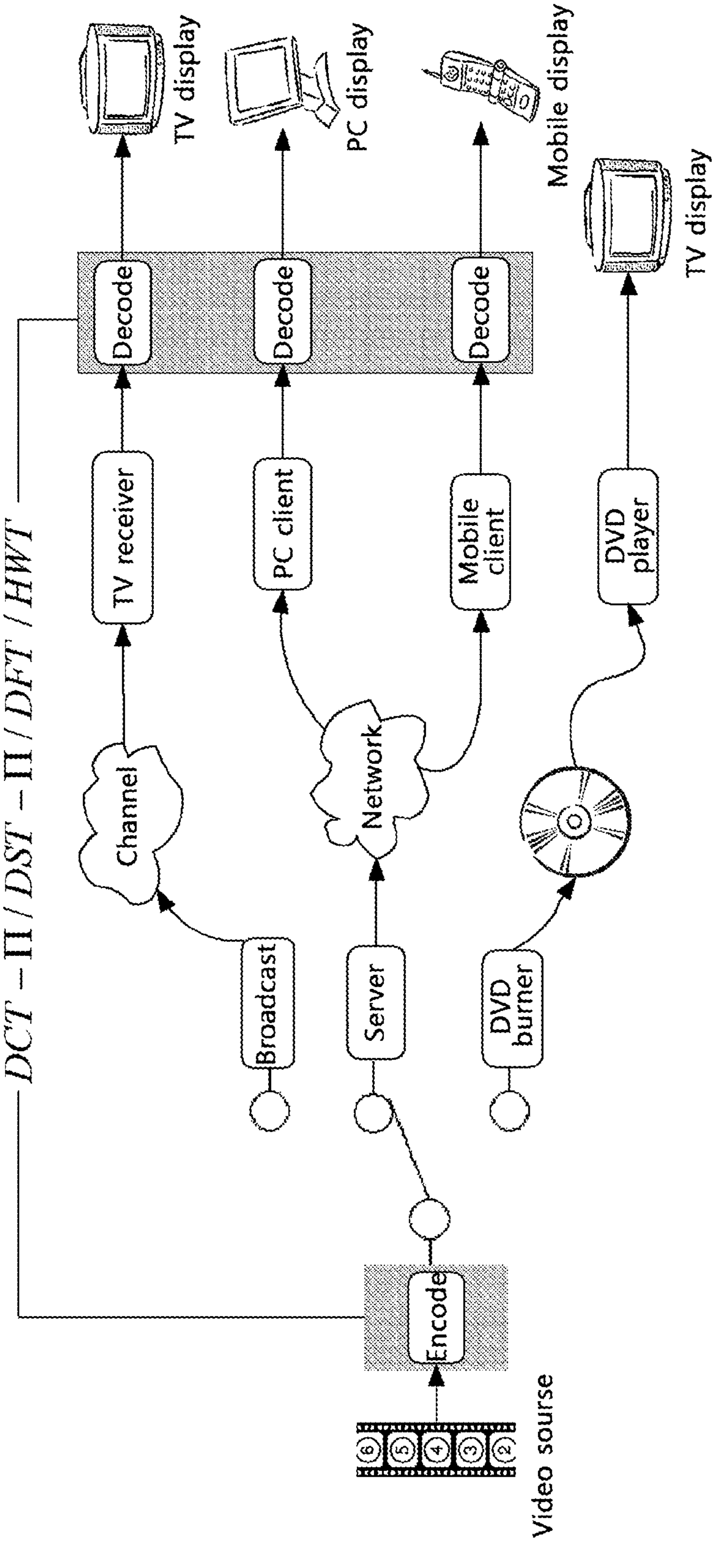
FIG. 7A is a diagram of a one-way video coding scenario according to an exemplary embodiment of the present invention.
Figure 7B:
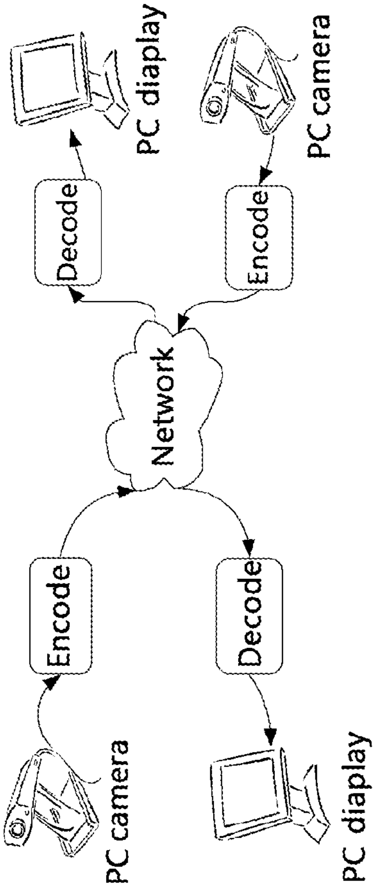
FIG. 7B is a diagram of a two-way video coding scenario according to an exemplary embodiment of the present invention.

Now, the signal transformation apparatus 500 applied as a video encoder and a video encoder is explained by referring to FIGS. 7A and 7B. FIG. 7A is a diagram of a one-way video coding scenario according to an exemplary embodiment of the present invention.

As shown in FIG. 7A, the video source encodes the video signal and broadcasts the signal to the TV or transmits the signal to the PC or the mobile display device via the server or the network. The video source may compress and provide the video as a DVD. In so doing, the video source encodes the signal using one of the DCT-II, the DST-II, the DFT, and the HWT by use of the signal transformation apparatus 500. The TV, the PC, and the mobile display device decode the signal using one of the DCT-II, the DST-II, the DFT, and the HWT with the signal transformation apparatus 500.

As such, the signal transformation apparatus 500 can be applied to the one-way video coding scenario.

FIG. 7B is a diagram of a two-way video coding scenario according to an exemplary embodiment of the present invention.

As shown in FIG. 7B, for video chat using the PC, the PC encodes the video signal captured by the camera and transmits the encoded video signal to the other PC. The PC receives and decodes the video signal of the other PC, and then displays the video on the display device. In so doing, the PC performs the encoding and the decoding using one of the DCT-II, the DST-II, the DFT, and the HWT with the signal transformation apparatus 500.

As such, the signal transformation apparatus 500 can be applied to the two-way video coding scenario.

Meanwhile, the present invention can be applied to a signal transformation method of the signal transformation apparatus 500. Also, the present invention can be applied to a computer-readable recording medium containing a computer program for executing the functions of the signal transformation apparatus 500. The present invention according to various embodiments can be embodied as a computer-readable code recorded to the computer-readable recording medium. The computer-readable recording medium can employ any data storage device for reading and storing data through the computer. For example, the computer-readable recording medium can include ROM, RAM, CD-ROM, magnetic tape, floppy disc, optical disc, hard disc drive, and so on. A computer-readable code or program stored to the computer-readable recording medium may be transmitted over the network connected between computers.

As set forth above, with the signal transformation apparatus, the signal transformation method, and the recording medium for select any one of the DCT-II, the DST-II, the DFT, and the HWT and transforming and outputting the input signal according to the selected transform, the hybrid architecture of the low complexity can be attained.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A signal transformation apparatus applying a hybrid architecture for Discrete Cosine Transform (DCT)-II, Discrete Sine Transform (DST)-II, Discrete Fourier Transform (DFT), and Haar Wavelet Transform (HWT), comprising:

a switching part for selecting any one of the DCT-II, the DST-II, the DFT, and the HWT; and a transformation part for transforming and outputting an input signal according to the transform selected by the switching part, wherein the switching part comprises:

a submatrix selector for selecting submatrix computation for any one of the DCT-II, the DST-II, the DFT, and the HWT; and a permutation matrix selector for selecting permutation matrix computation for any one of the DCT-II, the DST-II, the DFT, and the HWT, wherein when the switching part selects the DCT-II, the submatrix selector selects $[L]_N$ as a submatrix and the permutation matrix selector selects $[D]_N$ as a permutation matrix, wherein the transformation part applies the DCT-II to the input signal by computing Equation (27) using the submatrix $[L]_N$ and the permutation matrix $[D]_N$;

$$[C]_N = \sqrt{\frac{2}{N}}[Pr]_N\begin{bmatrix} I_{N/2} & 0 \\ 0 & L_{N/2}\end{bmatrix}[I_2\otimes Pr_{N/2}]\left[I_2\otimes\begin{bmatrix} I_{N/4} & 0 \\ 0 & L_{N/4}\end{bmatrix}\right] [I_4\otimes Pr_{N/4}]\left[I_4\otimes\begin{bmatrix} I_{N/8} & 0 \\ 0 & L_{N/8}\end{bmatrix}\right]\ldots[I_{N/4}\otimes Pr_4] \left[I_{N/4}\otimes\begin{bmatrix} I_2 & 0 \\ 0 & L_2\end{bmatrix}\right][I_{N/2}\otimes C_2]\left[I_{N/4}\otimes\begin{bmatrix} I_2 & 0 \\ 0 & D_2\end{bmatrix}\right] \left[I_{N/4}\otimes\begin{bmatrix} I_2 & I_2 \\ I_2 & -I_2\end{bmatrix}\right][I_{N/4}\otimes Pc_4]\ldots\left[I_4\otimes\begin{bmatrix} I_{N/8} & 0 \\ 0 & D_{N/8}\end{bmatrix}\right] \left[I_4\otimes\begin{bmatrix} I_{N/8} & I_{N/8} \\ I_{N/8} & -I_{N/8}\end{bmatrix}\right][I_4\otimes Pc_{N/4}]\left[I_2\otimes\begin{bmatrix} I_{N/4} & 0 \\ 0 & D_{N/4}\end{bmatrix}\right] \left[I_4\otimes\begin{bmatrix} I_{N/4} & I_{N/4} \\ I_{N/4} & -I_{N/4}\end{bmatrix}\right][I_2\otimes Pc_{N/2}]\begin{bmatrix} I_{N/2} & 0 \\ 0 & D_{N/2}\end{bmatrix} \begin{bmatrix} I_{N/2} & I_{N/2} \\ I_{N/2} & -I_{N/2}\end{bmatrix}[Pc]_N, \tag{27}$$

wherein the submatrix $[L]_N$ and the permutation matrix $[D]_N$ are defined as $$[L]_N = \begin{bmatrix} \sqrt{2} & 0 & 0 & \cdots \\ -\sqrt{2} & 2 & 0 & \cdots \\ \sqrt{2} & -2 & 2 & \cdots \\ \vdots & \vdots & & \ddots \end{bmatrix},\ [D]_N = \begin{bmatrix} C_{4N}^{\Phi_0} & 0 & \cdots & 0 \\ 0 & C_{4N}^{\Phi_1} & & \vdots \\ \vdots & & \ddots & 0 \\ 0 & \cdots & 0 & C_{4N}^{\Phi_{N-1}} \end{bmatrix},\ \text{and}$$

$$\Phi_i = 2i+1,\ i\in\{0, 1, 2, \ldots, N-1\}$$

and $$[Pr]_2 = [I]_2 \text{ and } [Pr]_N = \begin{bmatrix} 1 & 0 & 0 & \ldots & 0 & 0 & \cdots & 0 \\ 0 & 0 & 0 & \cdots & 1 & 0 & \cdots & 0 \\ 0 & 1 & 0 & & 0 & 0 & \cdots & 0 \\ 0 & 0 & 0 & & 0 & 1 & & 0 \\ 0 & 0 & 1 & & 0 & 0 & & 0 \\ 0 & 0 & 0 & & 0 & 0 & \ddots & 0 \\ 0 & 0 & 0 & \ddots & 0 & 0 & & 0 \\ 0 & 0 & 0 & 0 & 0 & 0 & & 1 \end{bmatrix},\ N\geq 4,\ \text{where}$$

$$[Pr]_N = [pr_{i,j}]_N,$$

$$\text{with}\begin{cases} pr_{i,j} = 1, & \text{if } i = 2j,\ 0\leq j\leq\frac{N}{2}-1, \\ pr_{i,j} = 1, & \text{if } i = (2j+1)\bmod N,\ \frac{N}{2}\leq j\leq N-1, \\ pr_{i,j} = 0, & \text{others,}\end{cases}\ \text{where}$$

$$i, j\in\{0, 1, \ldots, N-1\}$$

and $$[Pc]_2 = [I]_2,\ \text{and } [Pc]_N = \begin{bmatrix} I_{N/4} & 0 & 0 & 0 \\ 0 & I_{N/4} & 0 & 0 \\ 0 & 0 & 0 & I_{N/4} \\ 0 & 0 & I_{N/4} & 0 \end{bmatrix},\ N\geq 4.$$

2. A signal transformation method applied to a signal transformation apparatus as claimed in claim 1.

3. A non-transitory computer-readable recording medium containing a computer program for executing functions of a signal transformation apparatus as claimed in claim 1.

4. A signal transformation apparatus applying a hybrid architecture for Discrete Cosine Transform (DCT)-II, Discrete Sine Transform (DST)-II, Discrete Fourier Transform (DFT), and Haar Wavelet Transform (HWT), comprising:

a switching part for selecting any one of the DCT-II, the DST-II, the DFT, and the HWT; and a transformation part for transforming and outputting an input signal according to the transform selected by the switching part, wherein the switching part comprises:

a submatrix selector for selecting submatrix computation for any one of the DCT-II, the DST-II, the DFT, and the HWT; and a permutation matrix selector for selecting permutation matrix computation for any one of the DCT-II, the DST-II, the DFT, and the HWT, wherein when the switching part selects the DST-II, the submatrix selector selects matrix $[U]_N$ as a submatrix and the permutation matrix selector selects $[D]_N$ as a permutation matrix, wherein the transformation part applies the DST-II to the input signal by computing Equation (45) by using the submatrix $[U]_N$ and the permutation matrix $[D]_N$ and multiplying every output by a matrix:

$$[S]_N = \sqrt{\frac{2}{N}}\,[S]_N \tag{45}$$

$$= \sqrt{\frac{2}{N}}\,[Pr]_N \begin{bmatrix} U_{N/2} & 0 \\ 0 & I_{N/2} \end{bmatrix}$$

$$\left[ I_2 \otimes \underbrace{\left[ \cdots \underbrace{\left[ I_2 \otimes [Pr]_4 \begin{bmatrix} U_2 & 0 \\ 0 & I_2 \end{bmatrix} [I_2 \otimes S_2] \begin{bmatrix} D_2 & 0 \\ 0 & I_2 \end{bmatrix} \begin{bmatrix} I_2 & I_2 \\ I_2 & -I_2 \end{bmatrix} [Pc]_4 \right]}_{S_4} \cdots \right]}_{S_{N/2}} \right]$$

$$\begin{bmatrix} D_{N/2} & 0 \\ 0 & I_{N/2} \end{bmatrix} \begin{bmatrix} I_{N/2} & I_{N/2} \\ I_{N/2} & -I_{N/2} \end{bmatrix} [Pc]_{N^*},$$

wherein $$[U]_N = \begin{bmatrix} 2 & -2 & 2 & -\sqrt{2} \\ 0 & 2 & -2 & \sqrt{2} \\ \vdots & \ddots & 2 & \vdots \\ 0 & \cdots & 0 & \sqrt{2} \end{bmatrix}_N, \quad [D]_N = \mathrm{diag}\left[C_{4N}^{\Phi_0}, \ldots, C_{4N}^{\Phi_{N-1}}\right]_N$$

$$\Phi_i = 2i+1,\ i = 0, 1, \cdots, N-1$$

and $$[Pr]_2 = [I]_2 \text{ and } [Pr]_N = \begin{bmatrix} 1 & 0 & 0 & \cdots & 0 & 0 & \cdots & 0 \\ 0 & 0 & 0 & \cdots & 1 & 0 & \cdots & 0 \\ 0 & 1 & 0 & & 0 & 0 & \cdots & 0 \\ 0 & 0 & 0 & & 0 & 1 & & 0 \\ 0 & 0 & 1 & & 0 & 0 & & 0 \\ 0 & 0 & 0 & & 0 & 0 & \ddots & 0 \\ 0 & 0 & 0 & \ddots & 0 & 0 & & 0 \\ 0 & 0 & 0 & 0 & 0 & 0 & & 1 \end{bmatrix}, \ N \geq 4, \quad \text{where}$$

$$[Pr]_N = [pr_{i,j}]_N,$$

$$\text{with } \begin{cases} pr_{i,j} = 1, & \text{if } i = 2j,\ 0 \leq j \leq \frac{N}{2} - 1, \\ pr_{i,j} = 1, & \text{if } i = (2j+1)\mathrm{mod}N,\ \frac{N}{2} \leq j \leq N-1, \\ pr_{i,j} = 0, & \text{others,} \end{cases} \quad \text{where}$$

$$i, j \in \{0, 1, \ldots, N-1\}$$

and

-continued $$[Pc]_2 = [I]_2, \text{ and } [Pc]_N = \begin{bmatrix} I_{N/4} & 0 & 0 & 0 \\ 0 & I_{N/4} & 0 & 0 \\ 0 & 0 & 0 & I_{N/4} \\ 0 & 0 & I_{N/4} & 0 \end{bmatrix}, \ N \geq 4.$$

5. A signal transformation apparatus applying a hybrid architecture for Discrete Cosine Transform (DCT)-II, Discrete Sine Transform (DST)-II, Discrete Fourier Transform (DFT), and Haar Wavelet Transform (HWT), comprising:

a switching part for selecting any one of the DCT-II, the DST-II, the DFT, and the HWT; and a transformation part for transforming and outputting an input signal according to the transform selected by the switching part, wherein the switching part comprises:

a submatrix selector for selecting submatrix computation for any one of the DCT-II, the DST-II, the DFT, and the HWT; and a permutation matrix selector for selecting permutation matrix computation for any one of the DCT-II, the DST-II, the DFT, and the HWT, wherein when the switching part selects the DFT, the submatrix selector selects $[Pr]_N$ as a submatrix and the permutation matrix selector selects $[W]_n$ as a permutation matrix, wherein the transformation part applies the DFT to the input signal by computing Equation (56) by using the submatrix $[Pr]_N$ and the permutation matrix $[W]_n$ and multiplying the input signal by a first matrix during first h steps of 2h steps and multiplying the input signal by a second matrix during last h steps:

$$[F]_N = ([Pr]_N)^{-1}[\tilde{F}]_N \tag{56}$$

$$= ([Pr]_N)^{-1} \begin{bmatrix} I_{N/2} & 0 \\ 0 & Pr_{N/2} \end{bmatrix} \begin{bmatrix} \tilde{F}_{N/2} & 0 \\ 0 & \tilde{F}_{N/2} \end{bmatrix} \begin{bmatrix} I_{N/2} & 0 \\ 0 & W_{N/2} \end{bmatrix} \begin{bmatrix} I_{N/2} & I_{N/2} \\ I_{N/2} & -I_{N/2} \end{bmatrix}$$

$$= [Pr]_N \begin{bmatrix} I_{N/2} & 0 \\ 0 & Pr_{N/2} \end{bmatrix} [I_2 \otimes Pr_{N/2}]$$

$$\left[ I_2 \otimes \begin{bmatrix} I_{N/4} & 0 \\ 0 & Pr_{N/4} \end{bmatrix} \right] \cdots [I_{N/4} \otimes Pr_4] \left[ I_{N/4} \otimes \begin{bmatrix} I_2 & 0 \\ 0 & Pr_2 \end{bmatrix} \right] [I_{N/2} \otimes F_2] \left[ I_{N/4} \otimes \begin{bmatrix} I_2 & 0 \\ 0 & W_2 \end{bmatrix} \right]$$

$$\left[ I_{N/4} \otimes \begin{bmatrix} I_2 & I_2 \\ I_2 & -I_2 \end{bmatrix} \right] \cdots \left[ I_2 \otimes \begin{bmatrix} I_{N/4} & 0 \\ 0 & W_{N/4} \end{bmatrix} \right]$$

$$\left[ I_2 \otimes \begin{bmatrix} I_{N/4} & I_{N/4} \\ I_{N/4} & -I_{N/4} \end{bmatrix} \right] \begin{bmatrix} I_{N/2} & 0 \\ 0 & W_{N/2} \end{bmatrix} \begin{bmatrix} I_{N/2} & I_{N/2} \\ I_{N/2} & -I_{N/2} \end{bmatrix}$$

-continued $$= [Pr]_N^{-1} \begin{bmatrix} I_{N/2} & 0 \\ 0 & Pr_{N/2} \end{bmatrix} \left[ I_2 \otimes \underbrace{\left[ \cdots \underbrace{[Pr]_4^{-1} \begin{bmatrix} I_2 & 0 \\ 0 & Pr_2 \end{bmatrix} [I_2 \otimes \tilde{F}_2] \begin{bmatrix} I_2 & 0 \\ 0 & W_2 \end{bmatrix} \begin{bmatrix} I_2 & I_2 \\ I_2 & -I_2 \end{bmatrix}}_{\tilde{F}_4} \cdots \right]}_{\tilde{F}_{N/2}} \right] \begin{bmatrix} I_{N/2} & 0 \\ 0 & W_{N/2} \end{bmatrix} \begin{bmatrix} I_{N/2} & I_{N/2} \\ I_{N/2} & -I_{N/2} \end{bmatrix},$$

wherein $$[Pr]_2 = [I]_2 \text{ and } [Pr]_N = \begin{bmatrix} 1 & 0 & 0 & \cdots & 0 & 0 & \cdots & 0 \\ 0 & 0 & 0 & \cdots & 1 & 0 & \cdots & 0 \\ 0 & 1 & 0 & & 0 & 0 & \cdots & 0 \\ 0 & 0 & 0 & & 0 & 1 & & 0 \\ 0 & 0 & 1 & & 0 & 0 & & 0 \\ 0 & 0 & 0 & & 0 & 0 & \ddots & 0 \\ 0 & 0 & 0 & \ddots & 0 & 0 & & 0 \\ 0 & 0 & 0 & 0 & 0 & 0 & & 1 \end{bmatrix}, \ N \geq 4, \quad \text{where}$$

$$[Pr]_N = [pr_{i,j}]_N,$$

$$\text{with } \begin{cases} pr_{i,j} = 1, & \text{if } i = 2j, \ 0 \leq j \leq \frac{N}{2} - 1, \\ pr_{i,j} = 1, & \text{if } i = (2j+1)\text{mod}N, \ \frac{N}{2} \leq j \leq N-1, \\ pr_{i,j} = 0, & \text{others,} \end{cases} \text{ where}$$

$$i, j \in \{0, 1, \ldots, N-1\},$$

and $$[W]_N = \begin{bmatrix} W^0 & 0 & \cdots & 0 \\ 0 & W^1 & & 0 \\ \vdots & & \ddots & \vdots \\ 0 & \cdots & 0 & W^{N-1} \end{bmatrix}$$

W is a diagonal complex unit for 2N point DFT matrix.

6. A signal transformation apparatus applying a hybrid architecture for Discrete Cosine Transform (DCT)-II, Discrete Sine Transform (DST)-II, Discrete Fourier Transform (DFT), and Haar Wavelet Transform (HWT), comprising:

a switching part for selecting any one of the DCT-II, the DST-II, the DFT, and the HWT; and a transformation part for transforming and outputting an input signal according to the transform selected by the switching part, wherein the switching part comprises:

a submatrix selector for selecting submatrix computation for any one of the DCT-II, the DST-II, the DFT, and the HWT; and a permutation matrix selector for selecting permutation matrix computation for any one of the DCT-II, the DST-II, the DFT, and the HWT, wherein when the switching part selects the HWT, the submatrix selector selects $[Pa]_N$ as a submatrix and the permutation matrix selector selects $[Pb]_N$ as a permutation matrix, wherein the transformation part applies the HWT to the input signal by computing Equation (64) by using the submatrix $[Pa]_N$ and the permutation matrix $[Pb]_N$ and multiplying the input signal by a matrix during last h steps of 2h steps:

$$[H]_N = [Pi]_N^{-1} [\tilde{H}]_N [Pj]_N^{-1} \tag{64}$$

$$= \frac{1}{r}[Pa]_N \begin{bmatrix} I_{N/2} & 0 \\ 0 & Pa_{N/2} \end{bmatrix} \begin{bmatrix} I_{3N/4} & 0 \\ 0 & Pa_{N/4} \end{bmatrix} \cdots \begin{bmatrix} I_{N-2} & 0 \\ 0 & Pa_{N/2} \end{bmatrix} \begin{bmatrix} I_{N-2} & 0 \\ 0 & \tilde{H}_2 \end{bmatrix} \begin{bmatrix} I_{N-4} & 0 \\ 0 & \begin{matrix} rI_2 & \\ & Pb_2 \end{matrix} \end{bmatrix} \begin{bmatrix} I_{N-4} & 0 \\ 0 & \begin{matrix} I_2 & I_2 \\ I_2 & -I_2 \end{matrix} \end{bmatrix} \cdots \begin{bmatrix} I_{N/2} & 0 \\ 0 & \begin{matrix} rI_{N/4} & \\ & Pb_{N/4} \end{matrix} \end{bmatrix} \begin{bmatrix} I_{N/2} & 0 \\ 0 & \begin{matrix} I_{N/4} & I_{N/4} \\ I_{N/4} & -I_{N/4} \end{matrix} \end{bmatrix} \begin{bmatrix} rI_{N/2} & 0 \\ 0 & Pb_{N/2} \end{bmatrix} \begin{bmatrix} I_{N/2} & I_{N/2} \\ I_{N/2} & -I_{N/2} \end{bmatrix} [Pb]_{N*},$$

wherein $[Pa]_N = [Pi]_N^{-1} = [Pi]_N$, $[Pi]_N = \begin{bmatrix} 0 & I_{N/2} \\ I_{N/2} & 0 \end{bmatrix}$ and $$[Pb]_N = r[Pj]_N^{-1} = r\begin{bmatrix} I_{N/2} & 0 \\ 0 & -I_{N/2} \end{bmatrix}[Pr]_N, \ [Pj]_N = [Pr]_N \begin{bmatrix} I_{N/2} & 0 \\ 0 & -I_{N/2} \end{bmatrix}.$$

* * * * *